(12) United States Patent
Hatakeyama et al.

(10) Patent No.: US 9,651,289 B2
(45) Date of Patent: May 16, 2017

(54) HEAT PUMP DEVICE, HEAT PUMP SYSTEM, AND A CONTROL METHOD OF THREE-PHASE INVERTER

(75) Inventors: Kazunori Hatakeyama, Tokyo (JP); Takuya Shimomugi, Tokyo (JP); Shinya Matsushita, Tokyo (JP); Naoki Wakuta, Tokyo (JP); Tsutomu Makino, Aichi (JP); Shinsaku Kusube, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 643 days.

(21) Appl. No.: 13/818,132

(22) PCT Filed: Aug. 30, 2010

(86) PCT No.: PCT/JP2010/064670
§ 371 (c)(1),
(2), (4) Date: Feb. 21, 2013

(87) PCT Pub. No.: WO2012/029099
PCT Pub. Date: Mar. 8, 2012

(65) Prior Publication Data
US 2013/0152609 A1    Jun. 20, 2013

(51) Int. Cl.
*F25B 19/00* (2006.01)
*F25B 49/02* (2006.01)
(Continued)

(52) U.S. Cl.
CPC ....... *F25B 49/025* (2013.01); *H02M 7/53875* (2013.01); *H02P 6/14* (2013.01);
(Continued)

(58) Field of Classification Search
CPC F25B 49/025; F25B 30/02; F25B 2700/2106; H02P 29/005; H02P 6/142
See application file for complete search history.

(56) References Cited

U.S. PATENT DOCUMENTS 6,154,473 A * 11/2000 Watanabe ................ 372/38.02
2003/0057907 A1 * 3/2003 Shibuya et al. ............ 318/439
(Continued)

FOREIGN PATENT DOCUMENTS

| JP | 60-068341 U | 5/1985 |
|---|---|---|
| JP | 61-091445 A | 5/1986 |

(Continued)

OTHER PUBLICATIONS

Keiji, Air Conditioner, Jun. 16, 1986, JPS61128056A, Whole Document.*
(Continued)

*Primary Examiner* — Larry Furdge
(74) *Attorney, Agent, or Firm* — Posz Law Group, PLC

(57) ABSTRACT

An adder adds a phase θplus, which is n times a size of 60 degrees, to a phase output from a phase switching unit and outputs the phase as a voltage command phase θ. A voltage generation unit generates voltage command value based on the voltage command phase output by the adder and outputs the command value. A drive-signal generation unit, based on an output from the voltage generation unit generates drive signals corresponding to respective switching elements of an inverter, and outputs respective generated drive signals to the corresponding switching elements of the inverter, and generates a high-frequency AC voltage in the inverter.

19 Claims, 21 Drawing Sheets

(51) Int. Cl.
*H02M 7/5387* (2007.01)
*H02P 6/14* (2016.01)
*H02P 6/15* (2016.01)
*H02P 29/62* (2016.01)
*F25B 30/02* (2006.01)

(52) U.S. Cl.
CPC ............... *H02P 6/15* (2016.02); *H02P 29/62* (2016.02); *F25B 30/02* (2013.01); *F25B 2600/021* (2013.01); *F25B 2700/2106* (2013.01); *Y02B 30/741* (2013.01)

(56) References Cited

U.S. PATENT DOCUMENTS

| 2005/0204760 | A1* | 9/2005 | Kurita et al. ................. 62/228.1 |
| 2006/0113949 | A1* | 6/2006 | Nishimura et al. ........... 318/723 |
| 2009/0039808 | A1* | 2/2009 | Hashimoto ............... 318/400.02 |
| 2009/0079374 | A1* | 3/2009 | De Four ................... H02P 6/20 318/400.34 |
| 2009/0251086 | A1* | 10/2009 | Sekimoto et al. ....... 318/400.23 |

FOREIGN PATENT DOCUMENTS

| JP | S61128056 A | * | 6/1986 |
| JP | S6222947 A | * | 1/1987 |
| JP | 08-226714 A | | 9/1996 |
| JP | 11-159467 A | | 6/1999 |
| JP | 11-324934 A | | 11/1999 |
| JP | 2005326054 A | * | 11/2005 |
| JP | 2007-267477 A | | 10/2007 |
| JP | 2008295269 A | * | 12/2008 |

OTHER PUBLICATIONS

Naomi, Air Conditioner and Preheating Method of Compressor, Nov. 24, 2005, JP2005326054A, Whole Document.*
Nobuo, Air Conditioner, Jan. 31, 1987, JPS6222947A, Whole Document.*
Kazuhiko, Drive Control Unit for Vibration Motor, Dec. 4, 2008, JP2008295269A, Whole Document.*
International Search Report of the International Searching Authority mailed Nov. 2, 2010 for the corresponding international application No. PCT/JP2010/064670 (with English translation).

* cited by examiner

HEAT PUMP DEVICE, HEAT PUMP SYSTEM, AND A CONTROL METHOD OF THREE-PHASE INVERTER

CROSS REFERENCE TO RELATED APPLICATION

This application is a U.S. national stage application of PCT/JP2010/064670 filed on Aug. 30, 2010, the disclosure of which is incorporated herein by reference.

TECHNICAL FIELD

The present invention relates to a method of heating a compressor used for a heat pump device.

BACKGROUND

Patent Literature 1 describes that when a liquid refrigerant amount accumulated in a compressor becomes a predetermined amount or more, a weak high-frequency open-phase current is caused to flow to a motor winding to warm the motor winding. Accordingly, liquid compression due to startup in a state with the liquid refrigerant being accumulated in the compressor is prevented to prevent damage of the compressor.

Patent Literature 2 describes that a direction of a current flowing to a stator coil of a motor is cyclically reversed by controlling an on/off cycle of a switching element. Accordingly, not only heat generation by an ohmic loss but also heat generation by an hysteresis loss is performed so that sufficient preheating can be performed with a less consumption current, thereby improving power efficiency.

CITATION LIST

Patent Literatures

Patent Literature 1: Japanese Patent Application Laid-open No. 8-226714
Patent Literature 2: Japanese Patent Application Laid-open No. 11-159467

SUMMARY

In the technique described in Patent Literature 1, because the open-phase current is caused to flow, the current does not flow to all the windings, and thus the compressor cannot be heated uniformly. Furthermore, when the open-phase current is caused to flow, by using an inverter, to a permanent magnet synchronous motor having a saliency ratio, a winding inductance depends on a rotor position. Therefore, the current may flow to all the phases according to the rotor position, thereby making it difficult to cause the open-phase current to flow.

In the technique described in Patent Literature 2, any one of the switching elements with one end connected to a power source side is repeatedly turned on and off for a predetermined number of times in a predetermined time period. Simultaneously therewith, any two of the switching elements with one end connected to an earth side are turned on for the predetermined time period, and then the current flowing to the stator coil is reversed. Therefore, the frequency of the current caused to flow to the winding cannot be a high frequency, and thus there is a limitation on generation of an iron loss by use of the high frequency and the efficiency cannot be improved. In addition, noise may be generated.

An object of the present invention is to heat a refrigerant accumulated in a compressor efficiently.

A heat pump device according to an aspect of the present invention includes: a compressor having a compression mechanism that compresses a refrigerant; a motor that operates the compression mechanism provided in the compressor; an inverter; and an inverter control unit that controls the inverter, wherein the inverter control unit includes a phase switching unit, an addition unit that changes a value n, which is an integer equal to or larger than 0, for every predetermined time, and outputs a phase θ3 obtained by adding a phase θplus, which is n times a size of 60 degrees, to the phase output from the phase switching unit, a voltage generation unit that generates a voltage command value based on the phase θ3 output by the addition unit and outputs the voltage command value, and a drive-signal generation unit that, based on an output from the voltage generation unit, generates drive signals corresponding to respective switching elements of the inverter, and outputs respective generated drive signals to the corresponding switching elements of the inverter, thereby generating a high-frequency AC voltage in the inverter.

The heat pump device according to the present invention generates drive signals based on the phase θ1 and the phase θ2 switched and output synchronously with a carrier signal. Accordingly, a high-frequency voltage having high waveform output accuracy can be generated, and the refrigerant accumulated in the compressor can be efficiently heated, while suppressing generation of noise.

Furthermore, the heat pump device according to the present invention generates drive signals based on the phase θ3 obtained by adding the phase θplus changed for every predetermined time to the phase θ1 or the phase θ2. Accordingly, even in a case of an IPM motor, the refrigerant accumulated in the compressor can be appropriately heated, regardless of a stop position of the rotor.

Particularly, because the phase θplus is an integral multiple of 60 degrees, motor noise, motor shaft vibrations, and the like caused by a distortion or the like of a current waveform can be suppressed.

DETAILED DESCRIPTION

First Embodiment

In a first embodiment, a basic configuration and operations of a heat pump device 100 are explained.

Figure 1:
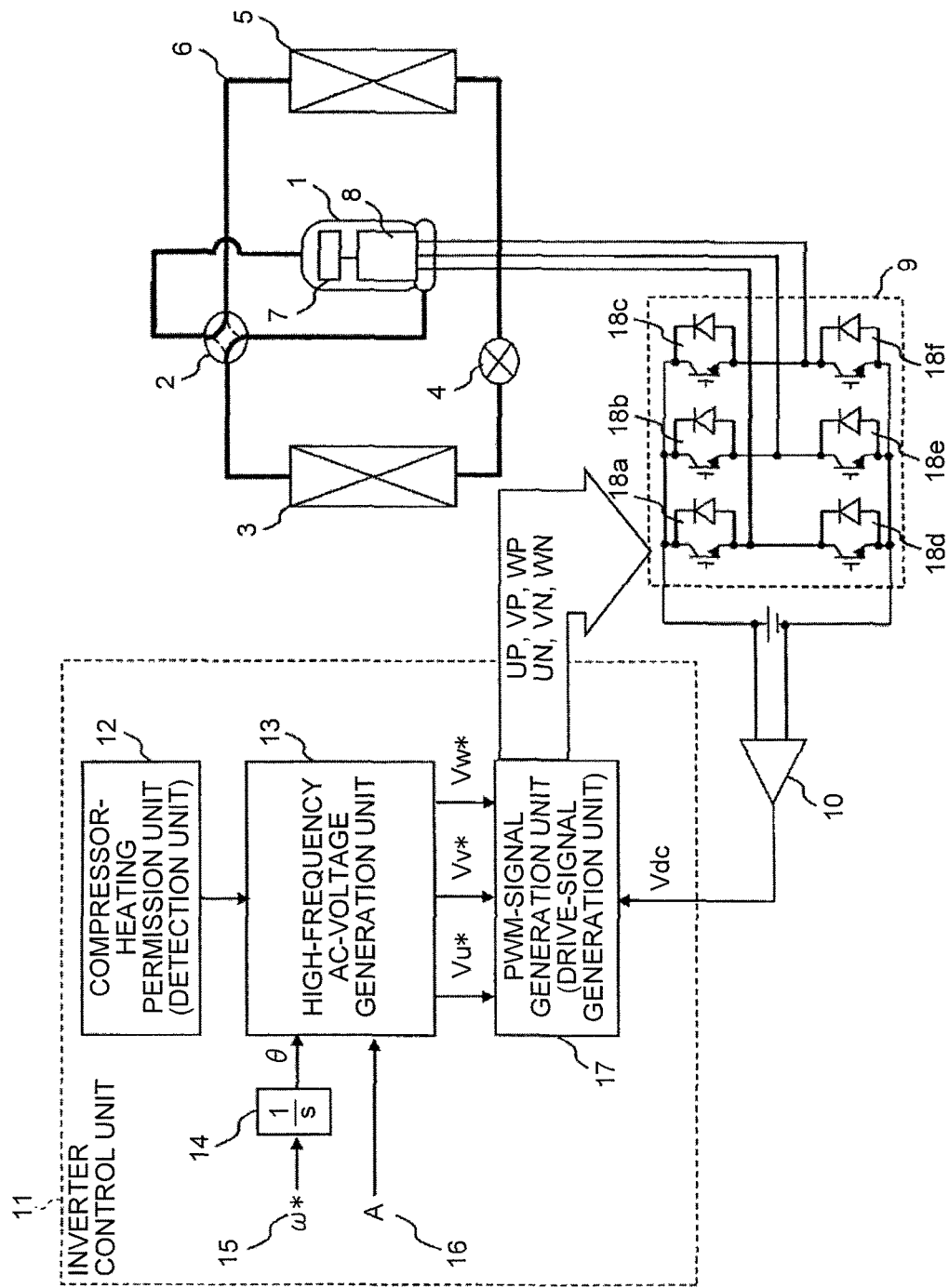
FIG. 1 depicts a configuration of a heat pump device 100 according to a first embodiment.

FIG. 1 depicts a configuration of the heat pump device 100 according to the first embodiment.

The heat pump device 100 includes a refrigerating cycle in which a compressor 1, a four-way valve 2, a heat exchanger 3, an expansion mechanism 4, and a heat exchanger 5 are sequentially connected by a refrigerant pipe 6. A compression mechanism 7 that compresses a refrigerant, and a motor 8 that operates the compression mechanism 7 are provided inside of the compressor 1.

An inverter 9 that applies a voltage to the motor 8 to drive the motor 8 is electrically connected to the motor 8, and includes a bus-bar-voltage detection unit 10 that detects a bus-bar voltage, which is a power source voltage of the inverter 9. A control input terminal of the inverter 9 is connected to an inverter control unit 11. The inverter control unit 11 includes a compressor-heating permission unit 12 (detection unit), a high-frequency AC-voltage generation unit 13, an integrator 14, a rotation-number command-output unit 15, an amplitude output unit 16, and a PWM-signal generation unit 17 (drive-signal generation unit).

The inverter 9 is a three-phase inverter in which series-connected circuits of two switching elements (18a and 18d, 18b and 18e, and 18c and 18f) are connected in parallel for three phases. By using PWM signals UP, VP, WP, UN, VN, and WN (drive signals) transmitted from the inverter control unit 11, the inverter 9 drives the switching elements respectively corresponding to the PWM signals (UP drives 18a, VP drives 18b, WP drives 18c, UN drives 18d, VN drives 18e, and WN drives 18f).

In the inverter control unit 11, when the compressor-heating permission unit 12 has determined that a liquid refrigerant has accumulated in the compressor 1 (a state where a refrigerant is pooled), the high-frequency AC-voltage generation unit 13 obtains voltage command values Vu*, Vv*, and Vw* to be applied to the motor 8. The PWM-signal generation unit 17 generates the PWM signals based on the voltage command values Vu*, Vv*, and Vw* obtained by the high-frequency AC-voltage generation unit 13.

A generation method of the PWM signals by the PWM-signal generation unit 17 is explained below.

Figure 2:
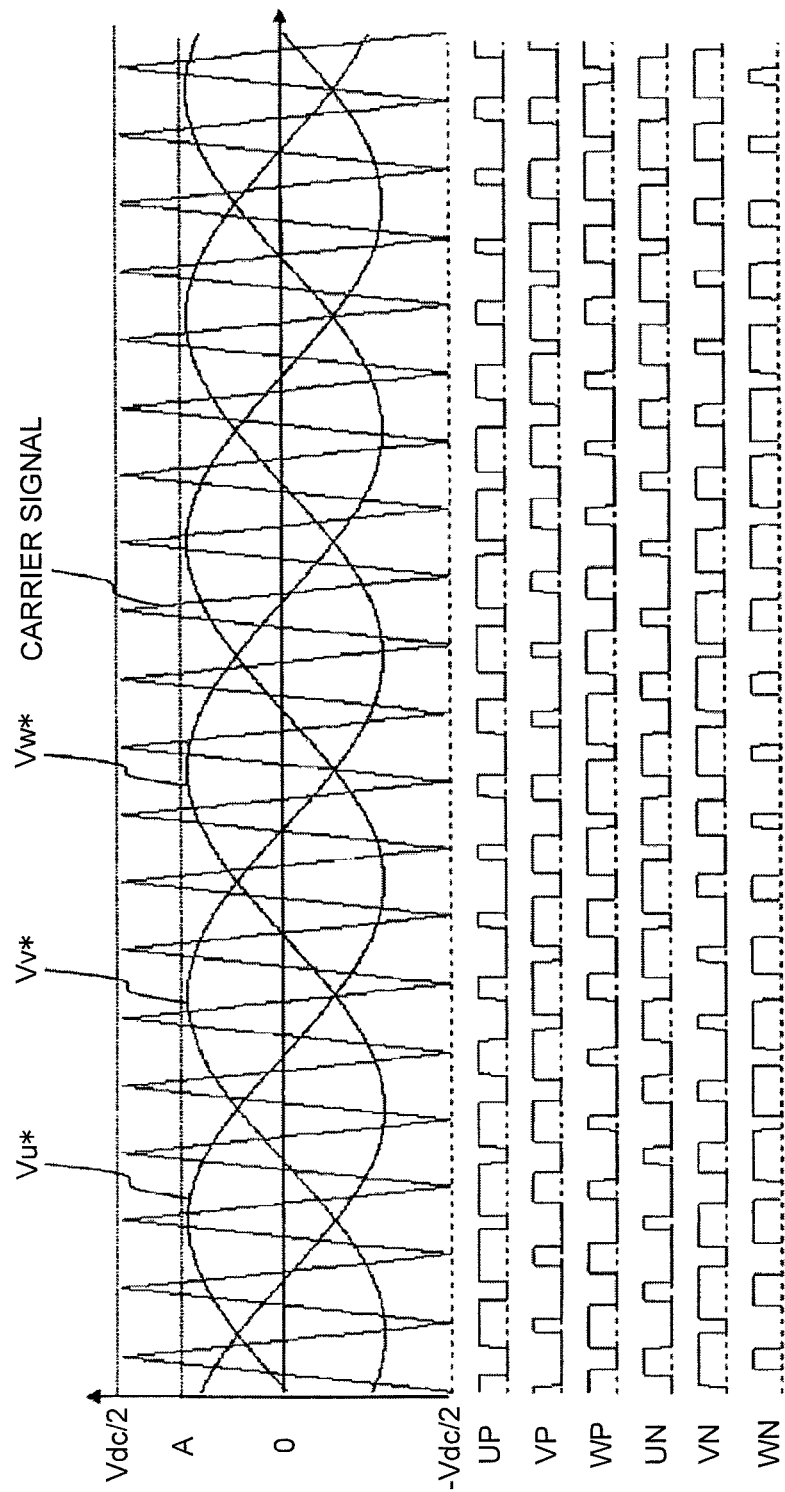
FIG. 2 depicts an input/output waveform of a PWM-signal generation unit 17.

FIG. 2 depicts an input/output waveform of the PWM-signal generation unit 17.

For example, it is defined that the voltage command values Vu*, Vv*, and Vw* are cosine waves (sine waves) with the phase being different from each other by $2\pi/3$ as shown in equations (1) to (3). However, A denotes an amplitude of the voltage command value, and θ denotes a phase of the voltage command value.

$$Vu^* = A \cos \theta \tag{1}$$

$$Vv^* = A \cos(\theta - (2/3)\pi) \tag{2}$$

$$Vw^* = A \cos(\theta + (2/3)\pi) \tag{3}$$

The high-frequency AC-voltage generation unit 13 calculates the voltage command values Vu*, Vv*, and Vw* according to the equations (1) to (3) based on a voltage phase command θ obtained by integrating a rotation number command ω* output by the rotation-number command-output unit 15 by the integrator 14, and an amplitude A output by the amplitude output unit 16. The high-frequency AC-voltage generation unit 13 outputs the calculated voltage command values Vu*, Vv*, and Vw* to the PWM-signal generation unit 17. The PWM-signal generation unit 17 compares the voltage command values Vu*, Vv*, and Vw* with a carrier signal (reference signal) having an amplitude Vdc/2 at a predetermined frequency, and generates the PWM signals UP, VP, WP, UN, VN, and WN based on magnitude relations between the voltage command values and the carrier signal. Vdc is the bus-bar voltage detected by the bus-bar-voltage detection unit 10.

For example, when the voltage command value Vu* is larger than the carrier signal, the UP is output as a voltage for turning on the switching element 18a and the UN is output as a voltage for turning off the switching element 18d. When the voltage command value Vu* is smaller than the carrier signal, the UP is output as a voltage for turning off the switching element 18a and the UN is output as a voltage for turning on the switching element 18d. The same applies to other signals, and the VP and VN are determined by comparison between the voltage command value Vv* and the carrier signal, and the WP and WN are determined by comparison between the voltage command value Vw* and the carrier signal.

Because an inverter generally adopts a complementary PWM system, the UP and UN, VP and VN, and WP and WN each have an opposite relation to each other. Therefore, there are eight switching patterns in total, and by combining the eight switching patterns, the inverter outputs the voltage.

The voltage command values Vu*, Vv*, and Vw* can be obtained by using two-phase modulation, Third Harmonic Injection Modulation, space vector modulation, or the like other than the equations (1) to (3).

An operation of the inverter control unit 11 is explained next.

Figure 3:
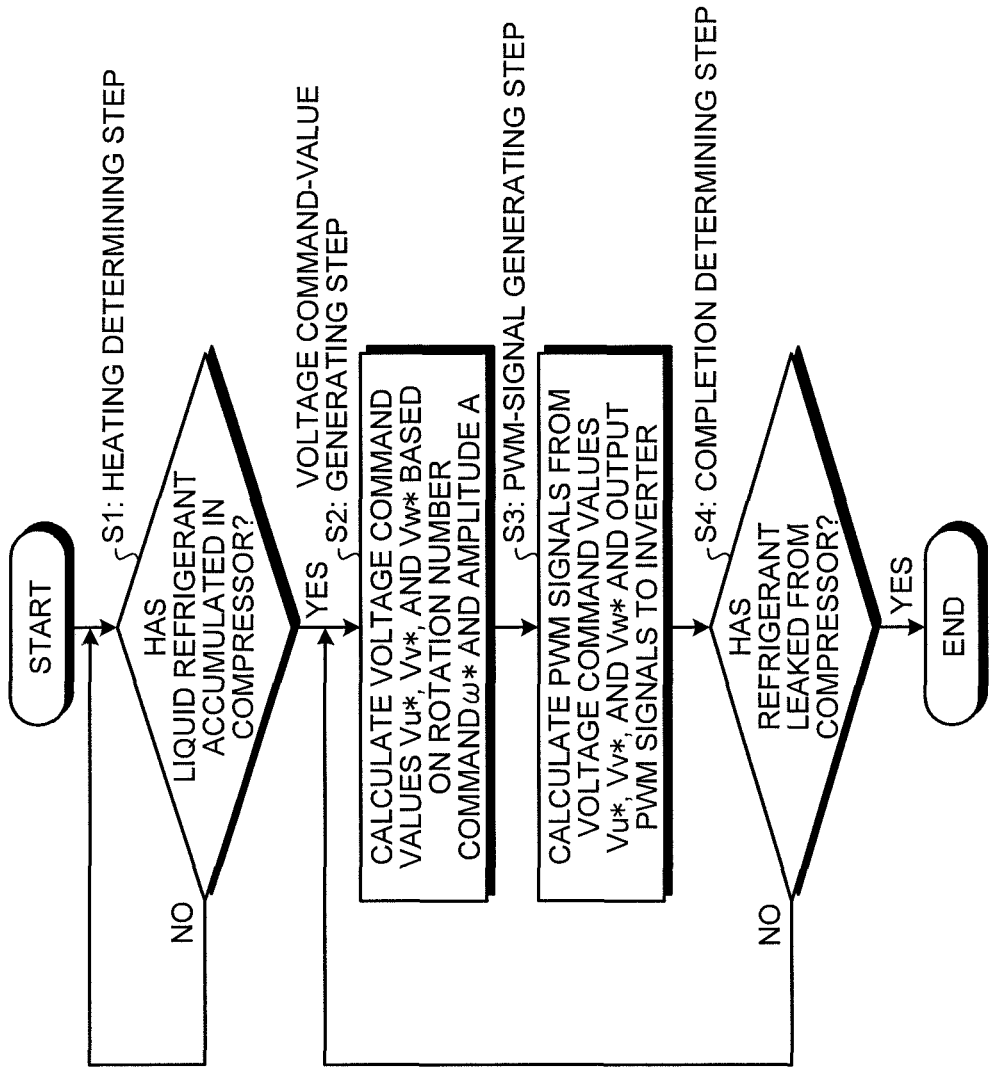
FIG. 3 is a flowchart of an operation of an inverter control unit 11.

FIG. 3 is a flowchart of an operation of the inverter control unit 11.

(S1: Heating Determining Step)

During shutdown of the compressor 1, the compressor-heating permission unit 12 determines whether a liquid refrigerant has accumulated in the compressor 1.

When having determined that the liquid refrigerant has accumulated in the compressor 1 (YES at S1), the process proceeds to S2, and the compressor-heating permission unit 12 generates a PWM signal for preheating. On the other hand, when having determined that the liquid refrigerant has not accumulated in the compressor 1 (NO at S1), the compressor-heating permission unit 12 determines again whether the liquid refrigerant has accumulated in the compressor 1, after a predetermined time has passed.

(S2: Voltage Command-value Generating Step)

The high-frequency AC-voltage generation unit 13 obtains the voltage phase command θ by integrating the rotation number command ω* output by the rotation-number command-output unit 15 by the integrator 14. The high-frequency AC-voltage generation unit 13 calculates the voltage command values Vu*, Vv*, and Vw* according to the equations (1) to (3) by using the voltage phase command θ and the amplitude A output by the amplitude output unit 16, and outputs the voltage command values to the PWM-signal generation unit 17.

(S3: PWM-signal Generating Step)

The PWM-signal generation unit 17 compares the voltage command values Vu*, Vv*, and Vw* output by the high-frequency AC-voltage generation unit 13 with the carrier signal to obtain the PWM signals UP, VP, WP, UN, VN, and WN, and output these PWM signals to the inverter 9. Therefore, the switching elements 18a to 18f of the inverter 9 are driven to apply a high frequency voltage.

By applying the high frequency voltage to the motor 8, the motor 8 is efficiently heated due to an iron loss of the motor 8 and a copper loss generated by the current flowing to the winding. The liquid refrigerant accumulated in the compressor 1 is heated and gasified by heating the motor 8, and leaks to outside of the compressor 1.

(S4: Completion Determining Step)

The compressor-heating permission unit 12 determines whether the refrigerant has leaked from the compressor 1.

When having determined that the refrigerant has leaked (YES at S4), the compressor-heating permission unit 12 determines that the device returns to a normal state, and finishes voltage application to the motor 8. On the other hand, when the refrigerant has not leaked (NO at S4), the process is returned to S2, to continue to generate the PWM signal for preheating.

A method of determining whether the liquid refrigerant has accumulated in the compressor 1 by the compressor-heating permission unit 12 at S1 is explained.

The state where the liquid refrigerant has accumulated in the compressor 1 generally occurs when the temperature of the compressor 1 is the lowest among the devices constituting the refrigerating cycle. The compressor 1 is made of metal, and heat capacity thereof is the largest in the refrigerating cycle and a temperature change is slow. Therefore, when an outside air temperature rises, a rise in the temperature of the compressor 1 is slower than other devices constituting the refrigerating cycle. Accordingly, when the outside air temperature has risen and a time has passed, the temperature of the compressor 1 becomes lower than that of the other devices, and the liquid refrigerant accumulates in the compressor 1. At this time, the compressor-heating permission unit 12 can detect or estimate the state and can heat the compressor.

For example, when the outside air temperature has risen by a predetermined temperature or more as compared to the temperature before a predetermined time has passed, the compressor-heating permission unit 12 determines that the liquid refrigerant has accumulated in the compressor 1.

Furthermore, the compressor-heating permission unit 12 can compare the temperatures of the devices constituting the refrigerating cycle other than the compressor 1 and the outside air temperature with the temperature of the compressor 1. When the temperature of the compressor 1 is lower than those temperatures, the compressor-heating permission unit 12 can determine that the liquid refrigerant has accumulated in the compressor 1. Moreover, because the temperature of the compressor 1 becomes the lowest among the devices constituting the refrigerating cycle from the early morning to the noon at which the temperature rises, the compressor-heating permission unit 12 can determine that the liquid refrigerant has accumulated in the compressor 1 from the early morning to the noon.

In this manner, when the compressor-heating permission unit 12 determines that the liquid refrigerant has accumulated in the compressor 1, the compressor 1 is heated, thereby enabling to heat the liquid refrigerant reliably and reduce power consumption.

Further, a voltage can be applied every time a predetermined time (for example, 12 hours) has passed since shutting down the compressor 1, taking such a state into consideration that the compressor-heating permission unit 12 cannot accurately determine the state where the liquid refrigerant has accumulated in the compressor 1 due to a detection error. Accordingly, breakage of the compressor due to compression of the liquid refrigerant and seizure of the motor due to dilution of a lubricant can be suppressed.

The rotation number command ω* output by the rotation-number command-output unit 15 at S2 is explained next.

If the high frequency voltage higher than an operating frequency at the time of a compression operation is applied to the motor 8, the rotor in the motor 8 cannot follow the frequency, and any rotation or amplitude is not generated. Therefore, at S2, it is preferable that the rotation-number command-output unit 15 outputs the rotation number command ω* equal to or higher than the operating frequency at the time of the compression operation.

Generally, the operating frequency at the time of the compression operation is 1 kilohertz at the highest. Therefore, it suffices that the high frequency voltage equal to or higher than 1 kilohertz is applied to the motor 8. If the high frequency voltage equal to or higher than 14 kilohertz is applied to the motor 8, because vibration noise of an iron core of the motor 8 approximately approaches an upper limit of an audible frequency, it is also effective to decrease the noise. For example, the rotation-number command-output unit 15 outputs the rotation number command ω* so as to obtain the high frequency voltage of about 20 kilohertz.

However, when the frequency of the high frequency voltage exceeds a maximum rated frequency of the switching elements 18a to 18f, a load due to breakage of the switching elements 18a to 18f is applied or the power source is short-circuited, and smoke may be emitted or ignition may occur. Therefore, it is preferable that the frequency of the high frequency voltage is equal to or lower than the maximum rated frequency in order to ensure reliability.

The amplitude A output by the amplitude output unit 16 at S2 is explained below.

A heating amount can be adjusted by a size of the amplitude A. The required heating amount is different depending on a size of the compressor 1 and environmental conditions such as the outside air temperature.

The size of the compressor 1 has been determined at the time of shipment of the product. Therefore, an approximate range of the amplitude A can be determined depending on the size of the compressor 1 at the time of shipment of the product. The environmental conditions change depending on an installed place, period, and time. The approximate range of the amplitude A determined depending on the size of the compressor 1 at the time of shipment of the product is stored in a memory. The amplitude output unit 16 measures the outside air temperature and the like by a temperature sensor, and controls the size of the amplitude A to be output within a range determined at the time of shipment of the product, depending on the environmental conditions such as the measured outside air temperature.

A method of determining leakage of the refrigerant by the compressor-heating permission unit 12 at S4 is explained next.

As described above, when the temperature of the compressor is the lowest among the devices constituting the refrigerating cycle, the liquid refrigerant accumulates in the compressor 1. On the contrary, if the temperature of the compressor 1 is not the lowest among the devices constituting the refrigerating cycle, the refrigerant leaks.

Therefore, for example, the compressor-heating permission unit 12 compares the temperatures of the devices constituting the refrigerating cycle other than the compressor 1 and the outside air temperature with the temperature of the compressor 1, and if the state where the temperature of the compressor 1 is higher than that of other devices and the outside air continues for a predetermined time or longer, the compressor-heating permission unit 12 determines that the refrigerant has leaked.

As described above, in the heat pump device 100 according to the first embodiment, when the liquid refrigerant has accumulated in the compressor 1, the high frequency voltage is applied to the motor 8, thereby enabling to heat the motor 8 efficiently, while suppressing noise. Accordingly, the refrigerant accumulated in the compressor 1 can be efficiently heated, and the accumulated refrigerant can be caused to leak to outside of the compressor 1.

A motor having an IPM structure and a concentrated winding motor having a small coil end and a low winding resistance are widely used recently for the compressor motor for the heat pump device in order to achieve high efficiency. Because the concentrated winding motor has the small winding resistance and an amount of heat generation due to the copper loss is small, it is required to cause a large amount of current to flow to the winding. When the large amount of current is caused to flow to the winding, the current flowing to the inverter 9 also increases and an inverter loss increases.

Therefore, if heating is performed by applying the high frequency voltage as described above, an inductance component due to the high frequency increases and winding impedance increases. Therefore, although the current flowing to the winding decreases and the copper loss decreases, the iron loss due to the application of the high frequency voltage occurs and the refrigerant can be efficiently heated. Because the current flowing to the winding decreases, the current flowing to the inverter also decreases, thereby enabling to decrease the loss of the inverter 9 and to perform highly efficient heating.

If heating is performed by applying the high frequency voltage as described above, when the compressor is the motor having the IPM structure, a rotor surface on which high-frequency magnetic fluxes interlink becomes a heat generating part. Therefore, because an increase of a contact surface with the refrigerant and rapid heating of the compression mechanism can be realized, the refrigerant can be efficiently heated.

It is currently a mainstream to use a semiconductor made of silicon (Si) generally for the switching elements 18a to 18f constituting the inverter 9 and diode elements connected to the switching elements in parallel. However, a wide bandgap semiconductor made of silicon carbide (SiC), gallium nitride (GaN), or diamond can be used instead thereof.

The switching elements and the diode elements formed of such a wide bandgap semiconductor have a high voltage resistance and a high allowable current density. Therefore, the switching elements and the diode elements can be downsized, and a semiconductor module incorporating these elements therein can be downsized by using the downsized switching elements and diode elements.

Furthermore, the switching element and the diode element formed of the wide bandgap semiconductor have a high heat resistance. Therefore, a radiation fin of a heat sink can be downsized and a water cooling part can be cooled by air, thereby enabling to downsize the semiconductor module further.

The power loss of the switching element and the diode element formed of the wide bandgap semiconductor is low. Therefore, the switching element and the diode element can be made highly efficient, thereby enabling to make the semiconductor module highly efficient.

It is preferable that both the switching element and the diode element are formed of the wide bandgap semiconductor. However, any one of the elements can be formed of the wide bandgap semiconductor, and identical effects as those described in the present embodiment can be obtained.

Identical effects can be obtained by using a MOSFET (Metal-Oxide-Semiconductor Field-Effect Transistor) having a super junction structure, which is known as a highly efficient switching element.

Furthermore, in a compressor having a scroll mechanism, high pressure relief from a compression chamber is difficult. Therefore, an excessive stress is applied to the compression mechanism at the time of liquid compression and breakage possibility is high, as compared to a compressor adopting another system. However, in the heat pump device 100 according to the first embodiment, efficient heating of the compressor is possible, and accumulation of the liquid refrigerant in the compressor can be suppressed. Accordingly, liquid compression can be prevented, and even when the scroll compressor is used as the compressor 1, the heat pump device 100 according to the first embodiment is effective.

Further, in a case of a heating device having a frequency of 10 kilohertz and an output exceeding 50 watts, the heating device may be subject to the limitations by statute. Therefore, the amplitude of the voltage command value can be adjusted beforehand so that the output does not exceed 50 watts or feedback control can be performed so that the output becomes 50 watts or lower by detecting the flowing current and the voltage.

Second Embodiment

A generation method of a high frequency voltage is explained in a second embodiment.

In a case of a general inverter, an upper limit of a carrier frequency, which is a frequency of the carrier signal, is determined by switching speed of the switching element of the inverter. In a case of a general IGBT (Insulated Gate Bipolar Transistor), the upper limit of the switching speed is about 20 kilohertz. Therefore, it is difficult to output a high frequency voltage equal to or larger than the carrier frequency, which is a carrier wave.

When the frequency of the high frequency voltage is about 1/10 of the carrier frequency, it may have adverse effects such that waveform output accuracy of the high frequency voltage deteriorates, and a DC component is superimposed. When the carrier frequency is set to 20 kilohertz taking this point into consideration, if the frequency of the high frequency voltage is set to equal to or lower than 2 kilohertz which is 1/10 of the carrier frequency, the frequency of the high frequency voltage is in an audio frequency range and there is fear of an increase in noise.

Figure 4:
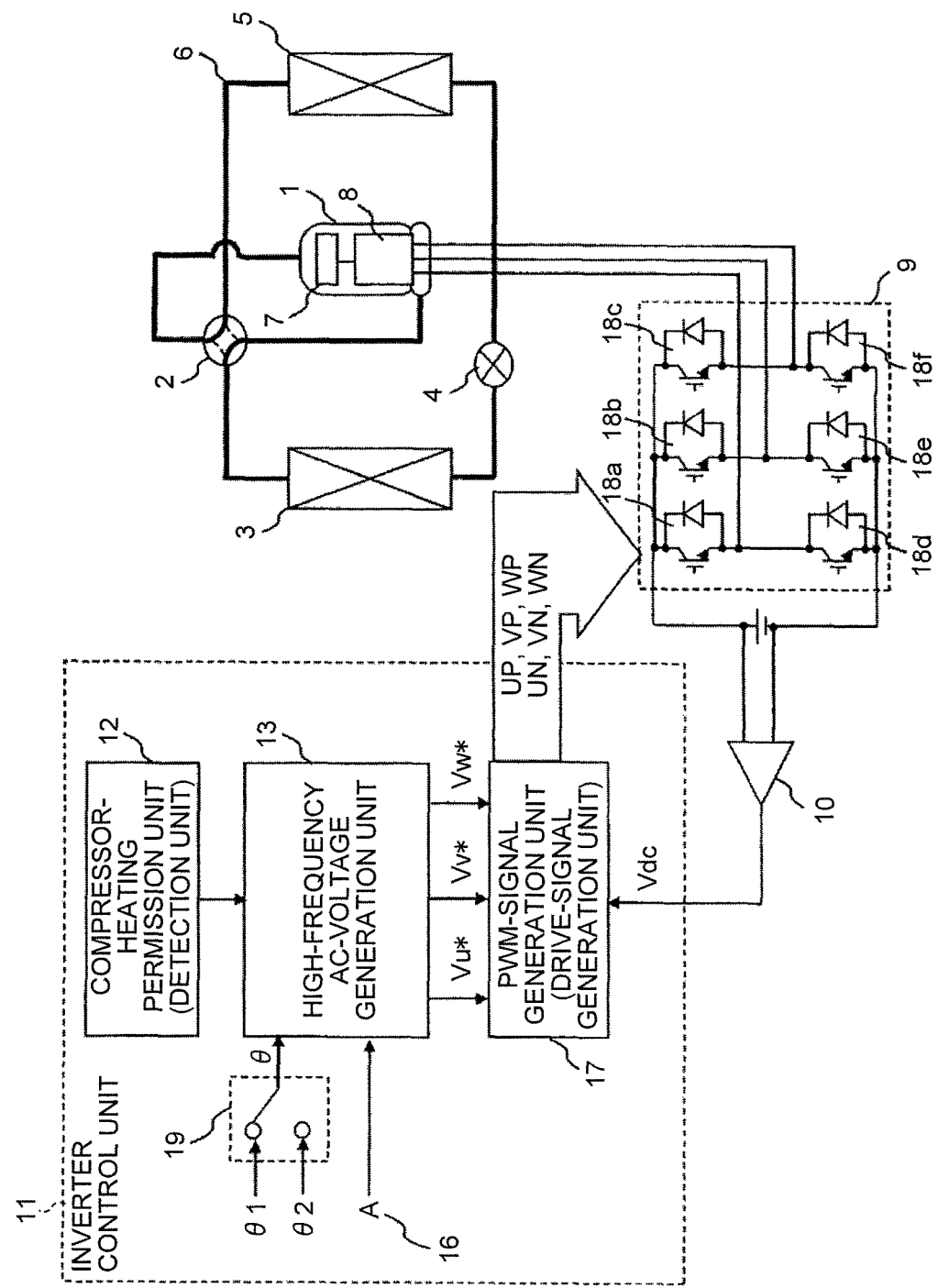
FIG. 4 depicts a configuration of the heat pump device 100 according to a second embodiment.

FIG. 4 depicts a configuration of the heat pump device 100 according to the second embodiment.

The heat pump device 100 according to the second embodiment is identical to the heat pump device 100 according to the first embodiment, except for including a phase switching unit 19 instead of the integrator 14 and the rotation-number command-output unit 15. Therefore, like constituent elements are denoted by like reference signs and explanations thereof will be omitted, and only different features are explained.

In the first embodiment, the rotation number command $\omega^*$ is integrated by the integrator 14 to obtain the phase $\theta$ of the voltage command value. Meanwhile, in the second embodiment, the phase switching unit 19 alternately switches two types of phases, that is, the phase $\theta 1$ and the phase $\theta 2$ that is different from the phase $\theta 1$ substantially by 180 degrees, and designates the phase as the phase of the voltage command value.

In the following explanations, it is assumed that $\theta 1 = 0$ (degree) and $\theta 2 = 180$ (degrees).

Operations of the inverter control unit 11 are explained next.

Because operations of the inverter control unit 11 according to the second embodiment are identical to those of the inverter control unit 11 according to the first embodiment except for the operation of S2 shown in FIG. 3, explanations thereof will be omitted.

At S2, the phase switching unit 19 switches the phases $\theta 1$ and $\theta 2$ alternately at timings of tops (peaks) or bottoms (troughs) of the carrier signal, or at timings of the tops and the bottoms, and outputs the phase to the high-frequency AC-voltage generation unit 13 as the phase $\theta$ of the voltage command value. The high-frequency AC-voltage generation unit 13 obtains the voltage command values Vu*, Vv*, and Vw* according to the equations (1) to (3) by using the voltage phase command $\theta$ and the amplitude A output by the amplitude output unit 16, and outputs the voltage command values to the PWM-signal generation unit 17.

The phase switching unit 19 switches the phases $\theta 1$ and $\theta 2$ at timings of peaks (tops) or troughs (bottoms) of the carrier signal, or at timings of peaks and troughs, thereby enabling to output the PWM signal synchronously with the carrier signal.

Figure 5:
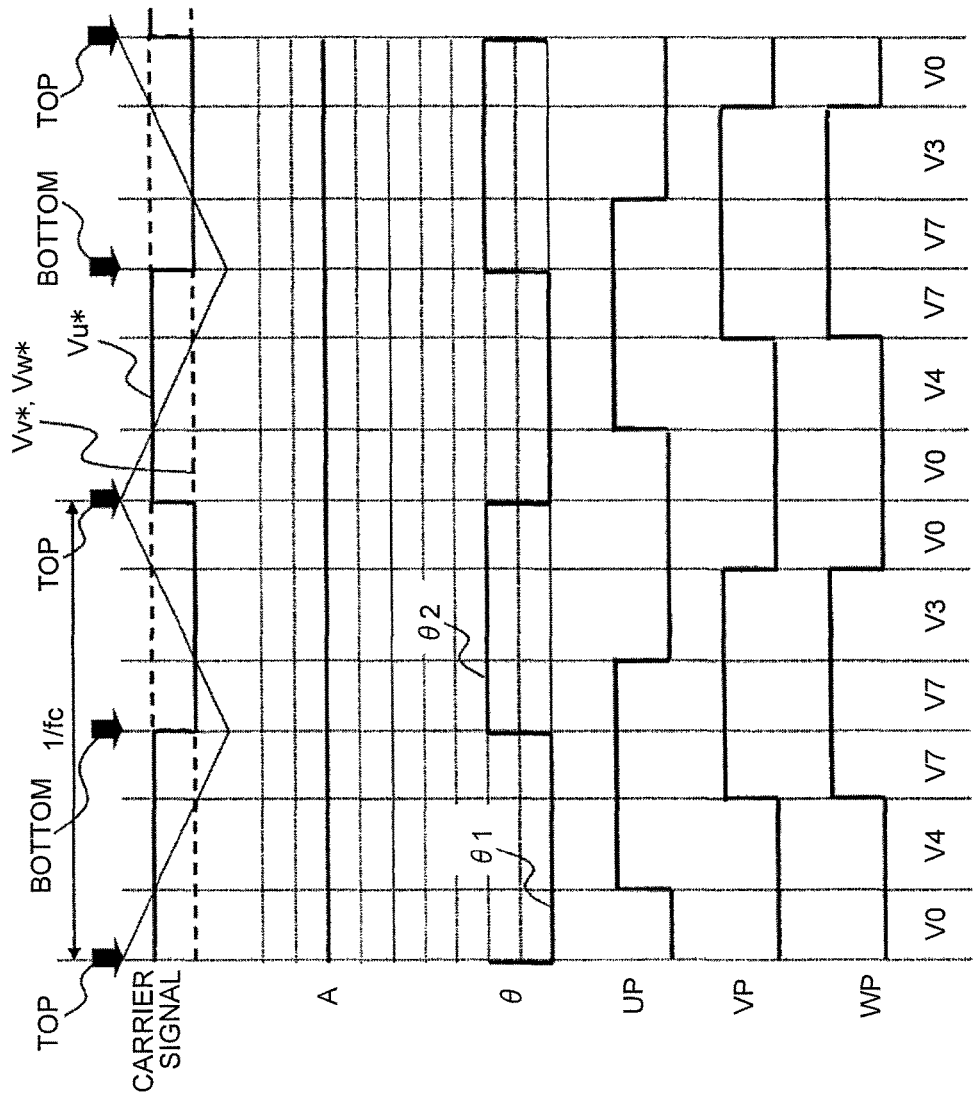
FIG. 5 is a timing chart when a phase switching unit 19 switches phases θ1 and θ2 alternately at timings of tops and bottoms of a carrier signal.

FIG. 5 is a timing chart when the phase switching unit 19 switches the phases $\theta 1$ and $\theta 2$ alternately at timings of the tops and the bottoms of the carrier signal. The on/off states of the PWM signals UP and UN, VP and VN, and WP and WN are opposite to each other, respectively, and if one of the on/off states becomes clear, the other becomes clear as well, and thus only the PWM signals UP, VP, and WP are shown.

As shown in FIG. 5, the PWM signals change, and voltage vectors change in order of V0 (UP=VP=WP=0), V4 (UP=1, VP=WP=0), V7 (UP=VP=WP=1), V3 (UP=0, VP=WP=1), V0 (UP=VP=WP=0), . . .

Figure 6:
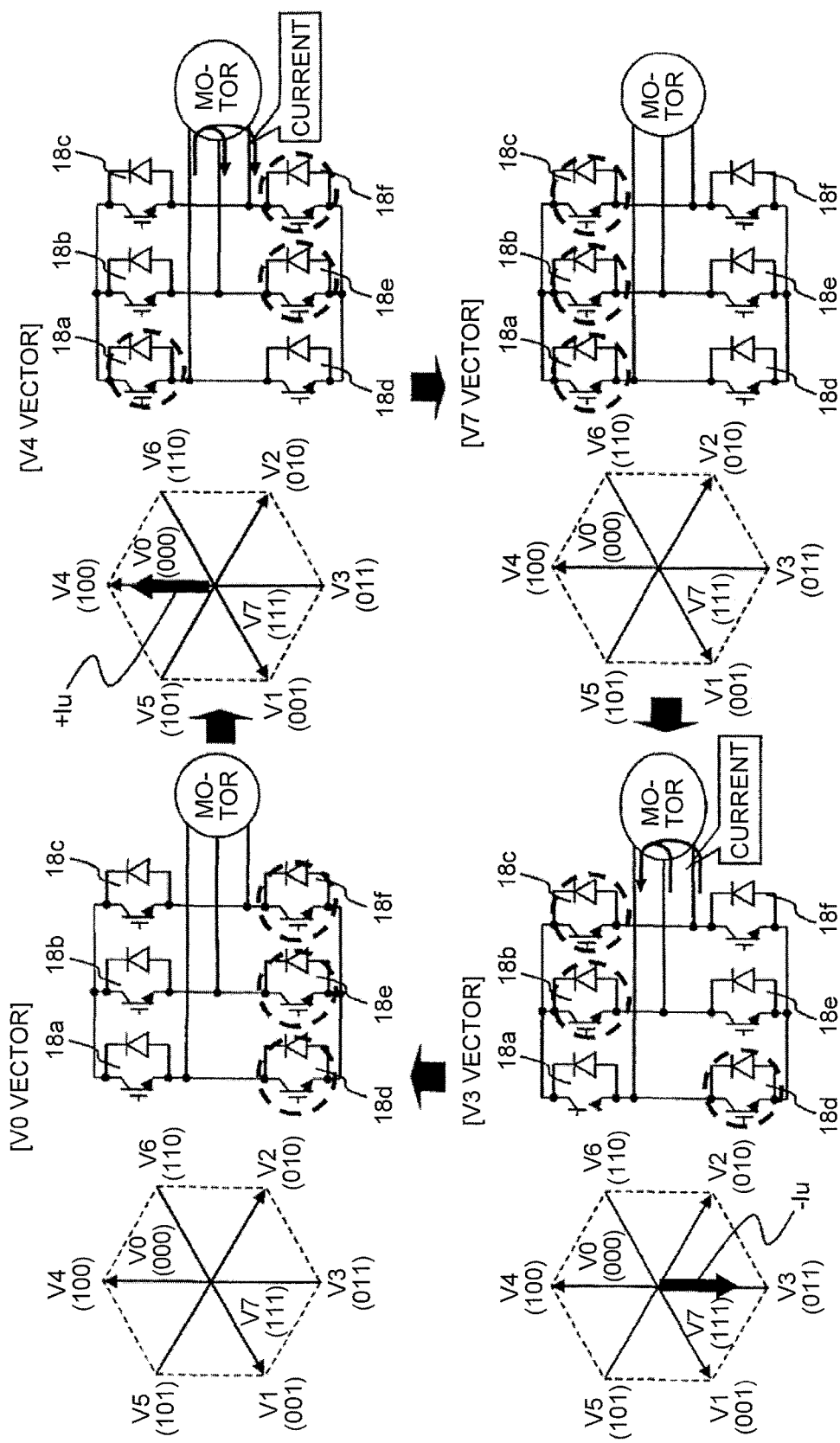
FIG. 6 is an explanatory diagram of a change in a voltage vector shown in FIG. 5.

FIG. 6 is an explanatory diagram of a change in the voltage vector shown in FIG. 5. In FIG. 6, it is expressed that the switching elements 18 enclosed by a broken line are on and the switching elements 18, which are not enclosed by a broken line, are off.

As shown in FIG. 6, when the V0 vector and the V7 vector are applied, any current does not flow. At the time of applying the V4 vector, in the winding of the motor 8, a current in a U phase direction (a +Iu current) flows to the motor 8 via a U phase and flows out from the motor 8 via a V phase and a W phase. At the time of applying the V3 vector, in the winding of the motor 8, a current in a −U phase direction (a −Iu current) flows to the motor 8 via the V phase and the W phase and flows out from the motor 8 via the U phase. That is, the currents in opposite directions to each other flow to the winding of the motor 8 at the time of applying the V4 vector and at the time of applying the V3 vector. Because the voltage vector changes in the order of V0, V4, V7, V3, V0, . . . , the +Iu current and the −Iu current flow alternately to the winding of the motor 8. Particularly, as shown in FIG. 5, because the V4 vector and the V3 vector appear in one carrier cycle (1/fc), an AC voltage synchronous with a carrier frequency fc can be applied to the winding of the motor 8.

Because the V4 vector (the +Iu current) and the V3 vector (the −Iu current) are alternately output, forward and reverse torques are switched instantly. Therefore, because the torques are cancelled out, the voltage can be applied, while suppressing vibrations of the rotor.

Figure 7:
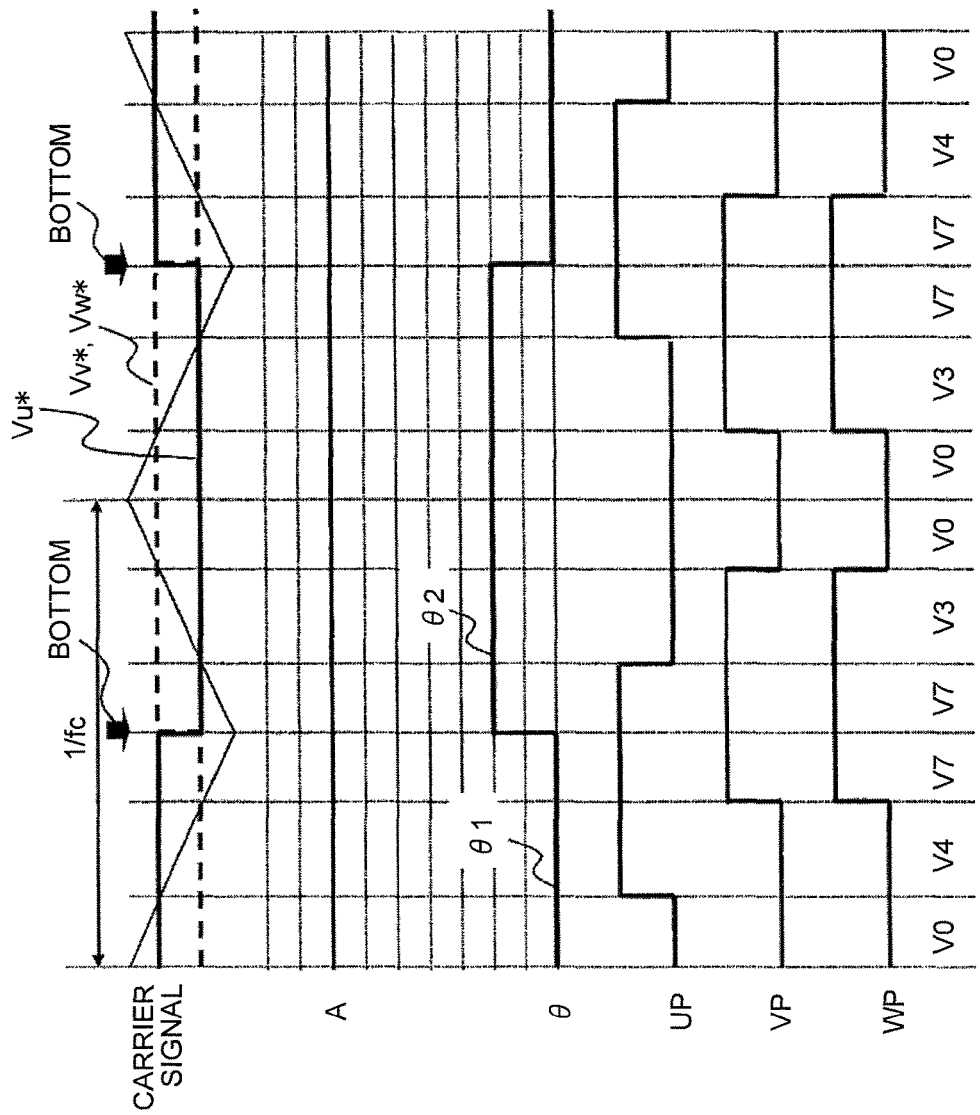
FIG. 7 is a timing chart when the phase switching unit 19 switches the phases θ1 and θ2 alternately at timings of the bottoms of the carrier signal.

FIG. 7 is a timing chart when the phase switching unit 19 switches the phases $\theta 1$ and $\theta 2$ alternately at timings of the bottoms of the carrier signal.

The PWM signals change as shown in FIG. 7, and the voltage vectors change in the order of V0, V4, V7, V7, V3, V0, V0, V3, V7, V7, V4, V0, . . . . Because the V4 vector and the V3 vector appear in two carrier cycles, the AC voltage at a ½ carrier frequency can be applied to the winding of the motor 8.

As described above, in the heat pump device 100 according to the second embodiment, two types of phases, that is, the phase $\theta 1$ and the phase $\theta 2$ that is different from the phase $\theta 1$ substantially by 180 degrees are switched alternately synchronously with the carrier signal, and designated as the phase of the voltage command value. Accordingly, the high frequency voltage synchronous with the carrier frequency can be applied to the winding of the motor 8.

Third Embodiment

In a third embodiment, a method of making a heating amount constant even in a case of using the IPM motor is explained.

Figure 8:
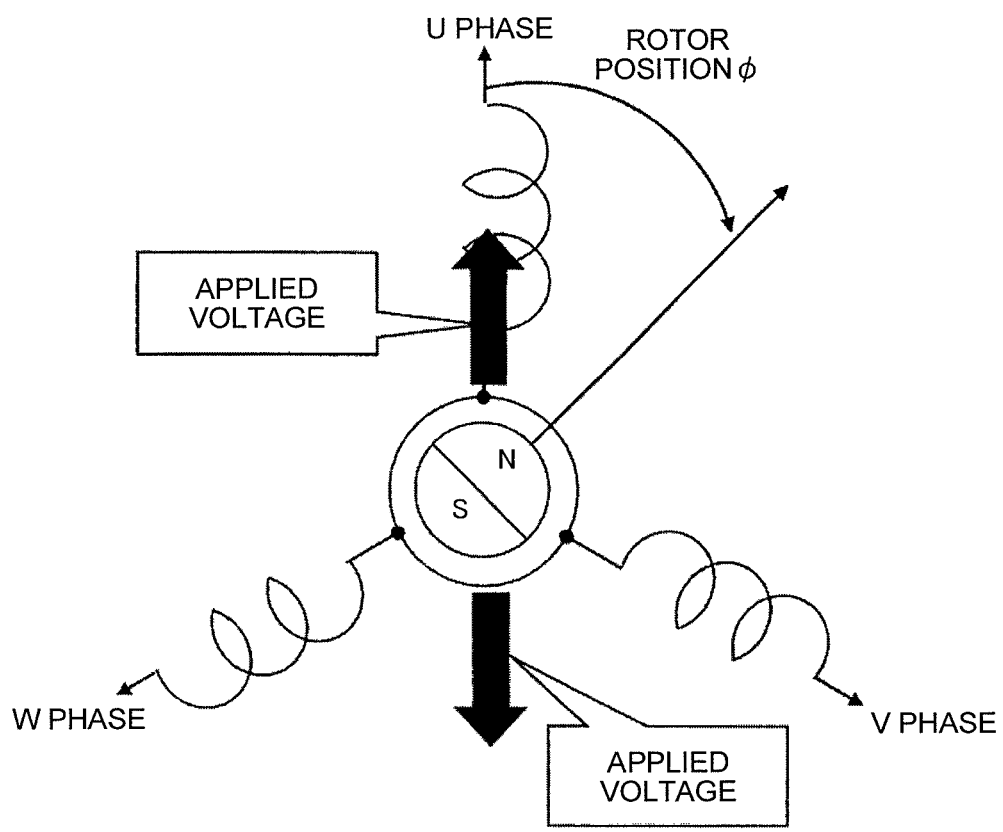
FIG. 8 is an explanatory diagram of a rotor position (a stop position of the rotor) of an IPM motor.

FIG. 8 is an explanatory diagram of a rotor position (a stop position of the rotor) of the IPM motor. A rotor position $\phi$ of the IPM motor is expressed by the size of an angle by which a direction of the N pole of the rotor deviates from the U phase direction.

Figure 9:
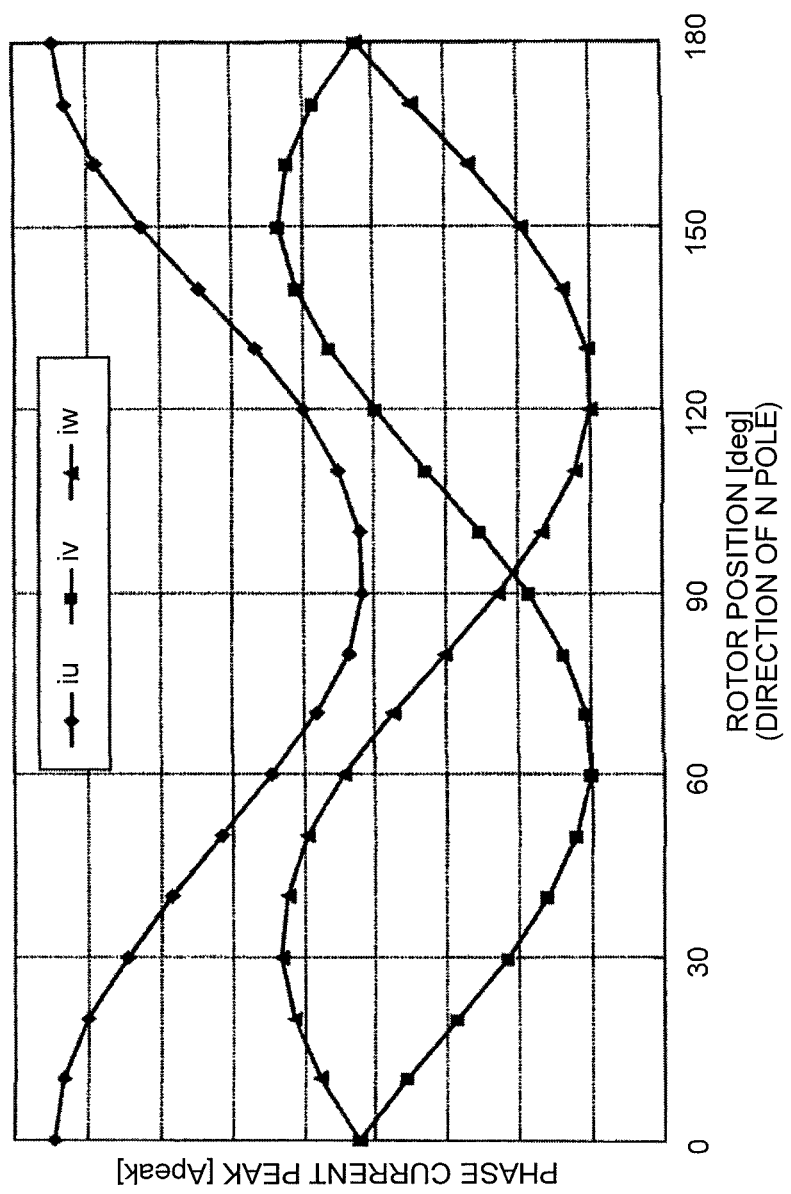
FIG. 9 depicts a current change due to the rotor position.

FIG. 9 depicts a current change due to the rotor position. In the case of the IPM motor, the winding inductance depends on the rotor position. Therefore, the winding impedance, which is expressed by a product of an electric angular frequency w and an inductance value, fluctuates according to the rotor position. Therefore, even if the same voltage is applied, the current flowing to the winding of the motor 8 fluctuates and the heating amount changes.

Figure 10:
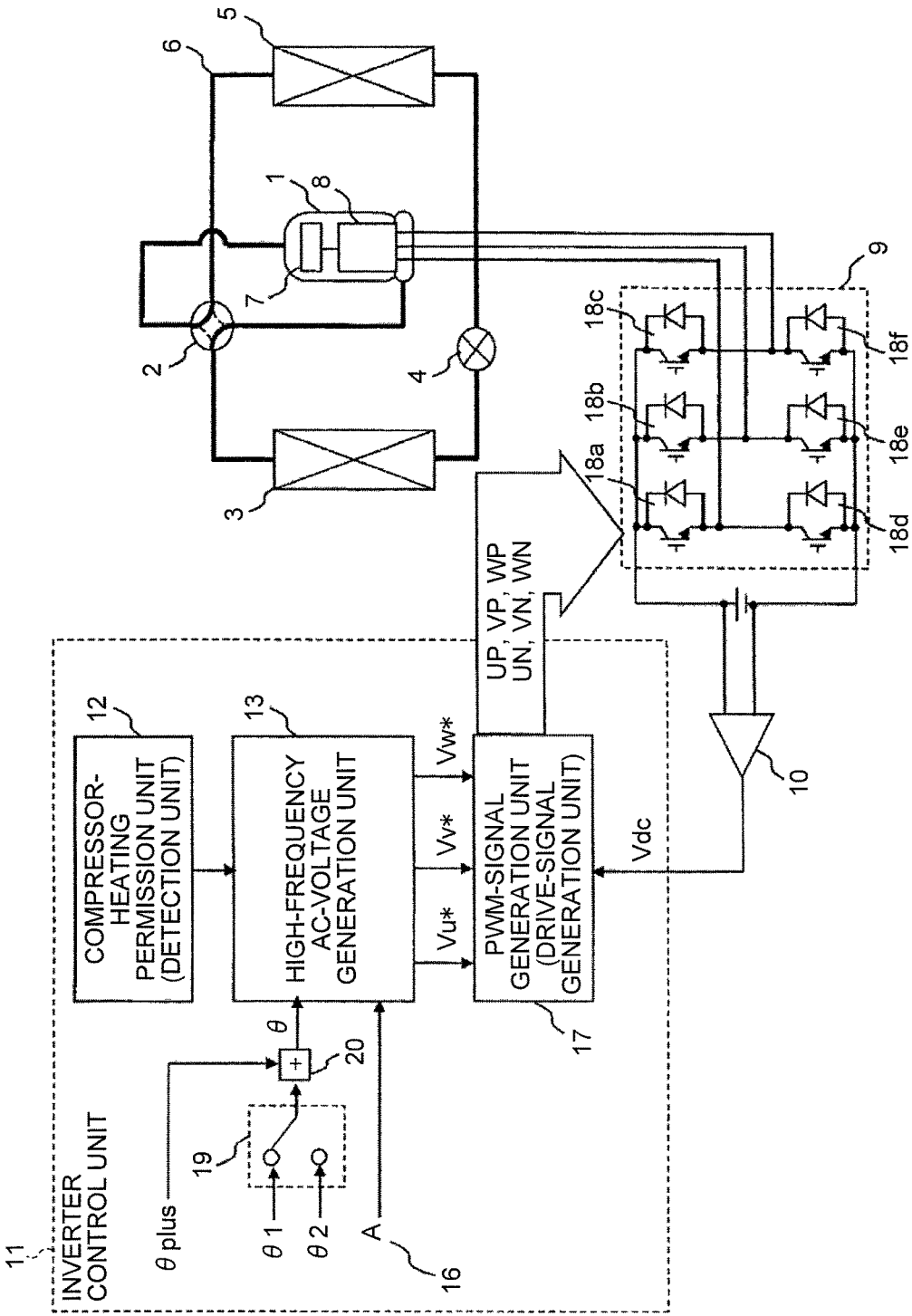
FIG. 10 depicts a configuration of the heat pump device 100 according to a third embodiment.

FIG. 10 depicts a configuration of the heat pump device 100 according to the third embodiment.

The heat pump device 100 according to the third embodiment is identical to the heat pump device 100 according to the second embodiment shown in FIG. 4, except that an adder 20 (addition unit) is added. Therefore, like constituent elements are denoted by like reference signs and explanations thereof will be omitted, and only different features are explained.

In the second embodiment, the phase switching unit 19 switches the two types of phases, that is, the phases $\theta 1$ and θ2 alternately and designates the phase as the phase of the voltage command value, thereby applying the AC voltage at the carrier frequency or a ½ carrier frequency to the winding of the motor 8. In this case, an energization phase is limited to the two phases of the phase θ1 and the phase θ2 having a phase difference of 180 degrees with respect to the phase θ1. Therefore, even if the same voltage is applied, the current flowing to the winding of the motor 8 fluctuates according to the rotor position, and the heating amount changes. As a result, much power may be consumed for acquiring the required heating amount depending on the rotor position.

Operations of the inverter control unit 11 are explained next.

Because operations of the inverter control unit 11 according to the present embodiment are identical to those of the inverter control unit 11 according to the first and second embodiments except for the operation of S2 in FIG. 3, explanations thereof will be omitted.

At S2, the phase switching unit 19 switches the phases θ1 and θ2 alternately at timings of the tops or the bottoms of the carrier signal or at timings of the tops and the bottoms, and outputs the phase. The adder 20 adds the phase change component θplus that changes with the lapse of time to the phase output by the phase switching unit 19 to designate the obtained phase as a phase θ3, and outputs the phase θ3 to the high-frequency AC-voltage generation unit 13 as the voltage phase command θ. The high-frequency AC-voltage generation unit 13 obtains the voltage command values Vu*, Vv*, and Vw* according to the equations (1) to (3) by using the voltage phase command θ and the amplitude A output by the amplitude output unit 16, and outputs the voltage command values to the PWM-signal generation unit 17.

The adder 20 adds the phase change component θplus to the phases θ1 and θ2 to cause the phase of the voltage command value to change with the lapse of time, thereby enabling to heat the compressor 1 uniformly regardless of the rotor position.

Figure 11:
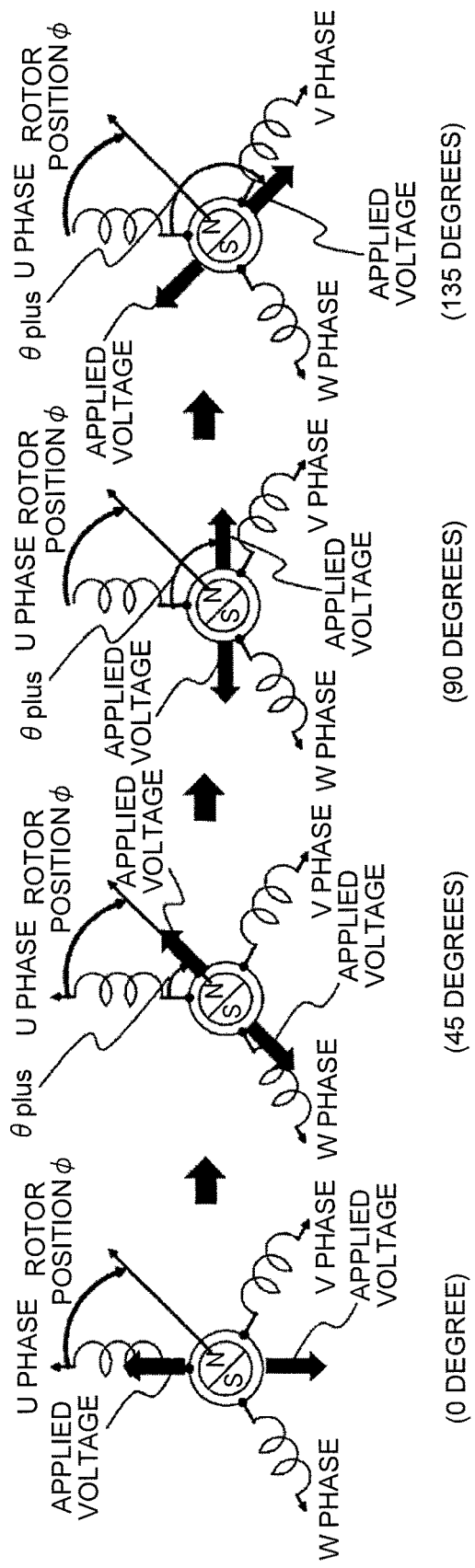
FIG. 11 depicts an applied voltage when a θplus is changed with the lapse of time.

FIG. 11 depicts an applied voltage when the θplus is changed with the lapse of time.

The θplus is changed by 45 degrees such as 0 degree, 45 degrees, 90 degrees, 135 degrees, . . . with the lapse of time. When the θplus is 0 degree, the phase θ of the voltage command value becomes 0 degree and 180 degrees. When the θplus is 45 degrees, the phase θ of the voltage command value becomes 45 degrees and 225 degrees. When the θplus is 90 degrees, the phase θ of the voltage command value becomes 90 degrees and 270 degrees. When the θplus is 135 degrees, the phase θ of the voltage command value becomes 135 degrees and 315 degrees.

That is, the θplus is first set to 0 degree, and the phase θ of the voltage command value is switched between 0 degree and 180 degrees synchronously with the carrier signal for a predetermined time. Thereafter, the θplus is switched to 45 degrees, and the phase θ of the voltage command value is switched between 45 degrees and 225 degrees synchronously with the carrier signal for a predetermined time. Thereafter, the θplus is switched to 90 degrees, . . . , and the phase θ of the voltage command value is switched between 0 degree and 180 degrees, between 45 degrees and 225 degrees, between 90 degrees and 270 degrees, between 135 degrees and 315 degrees, . . . for every predetermined time.

Accordingly, because the energization phase of the high-frequency AC voltage changes with the lapse of time, the compressor 1 can be heated uniformly without depending on the rotor position.

Figure 12:
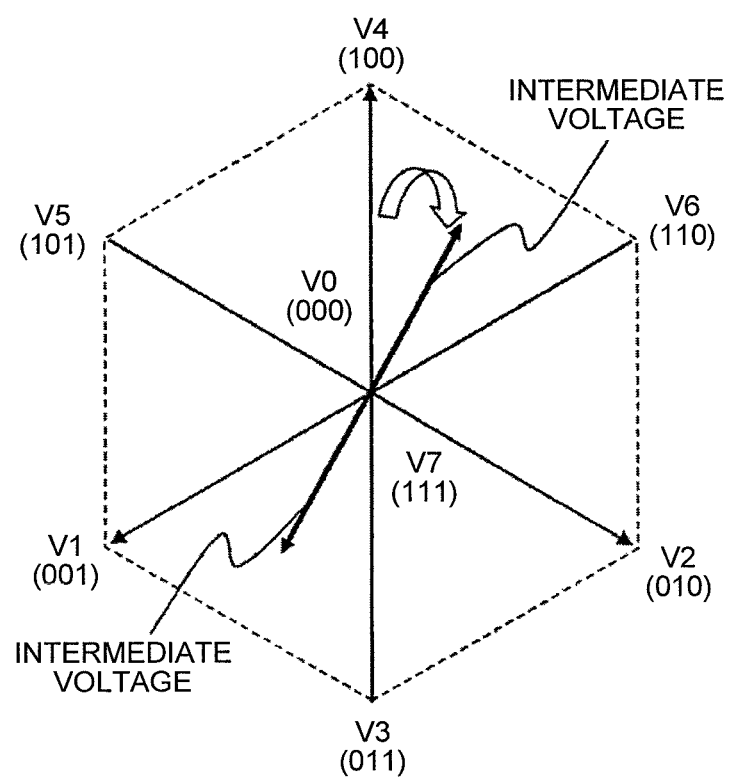
FIG. 12 is an explanatory diagram of an intermediate voltage.

FIG. 12 is an explanatory diagram of an intermediate voltage. The intermediate voltage is a voltage having a phase in a different direction from the respective phases (U phase, −U phase, V phase, −V phase, W phase, and −W phase).

The inverter 9 can perform switching only in eight patterns of V0 to V7. Therefore, if the energization phase is switched as shown in FIG. 11, for example, when the θplus is 45 degrees, the intermediate voltage shown in FIG. 12 is generated by the voltage vectors of V4 and V6 or V3 and V1.

Similarly, when the θplus is 90 degrees, 135 degrees, or the like other than 45 degrees, the intermediate voltage is also generated by the two voltage vectors.

Figure 13:
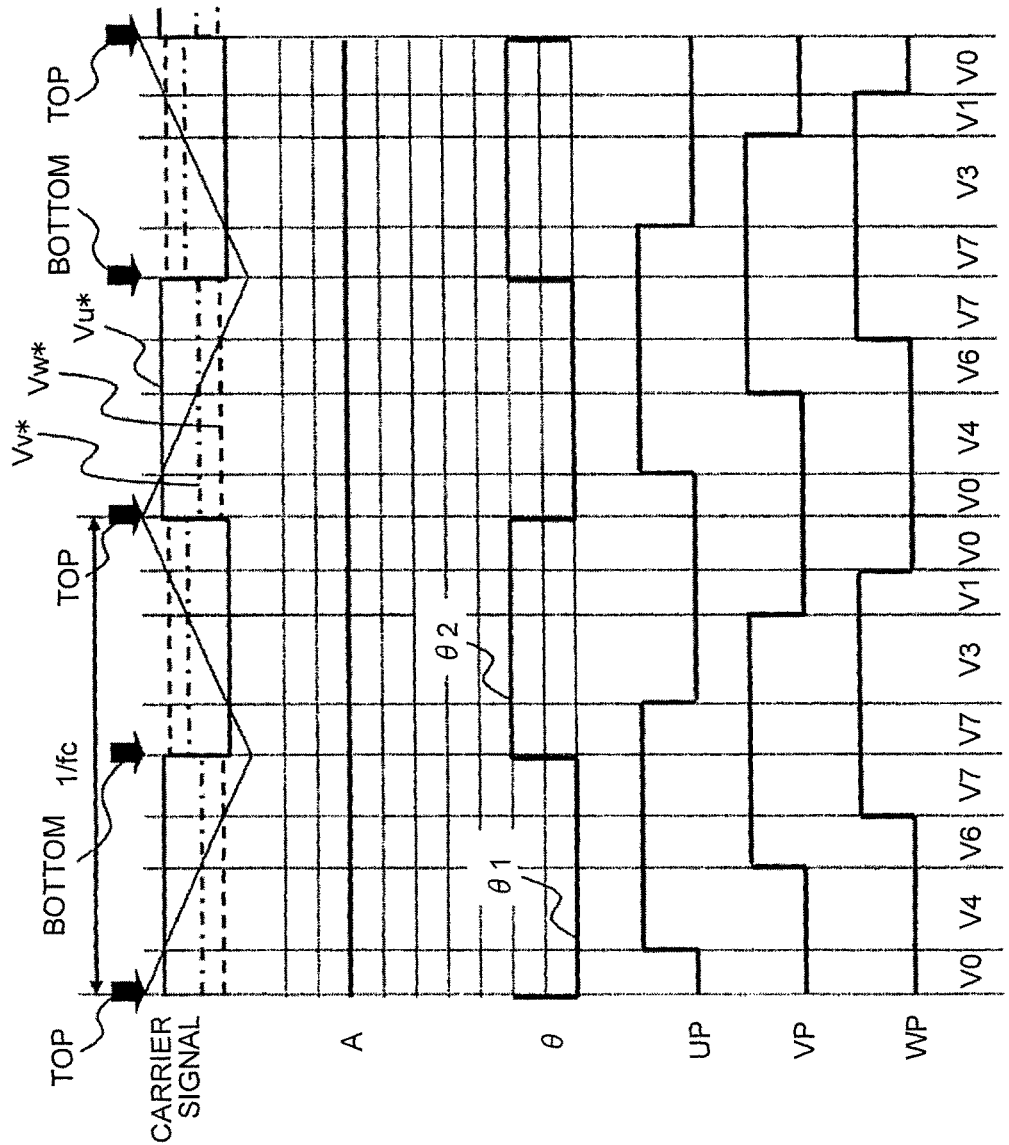
FIG. 13 is a timing chart at the time of the θplus being 45 degrees, when the phase switching unit 19 switches the phases θ1 and θ2 alternately at timings of the tops and the bottoms of the carrier signal.

FIG. 13 is a timing chart at the time of the θplus being 45 degrees, when the phase switching unit 19 switches the phases θ1 and θ2 alternately at timings of the tops and the bottoms of the carrier signal.

As shown in FIG. 13, the two voltage vectors (V4 and V6, or V3 and V1) are output between V0 and V7. In this manner, the intermediate voltage described above is generated by outputting the two different voltage vectors between V0 and V7.

Figure 14:
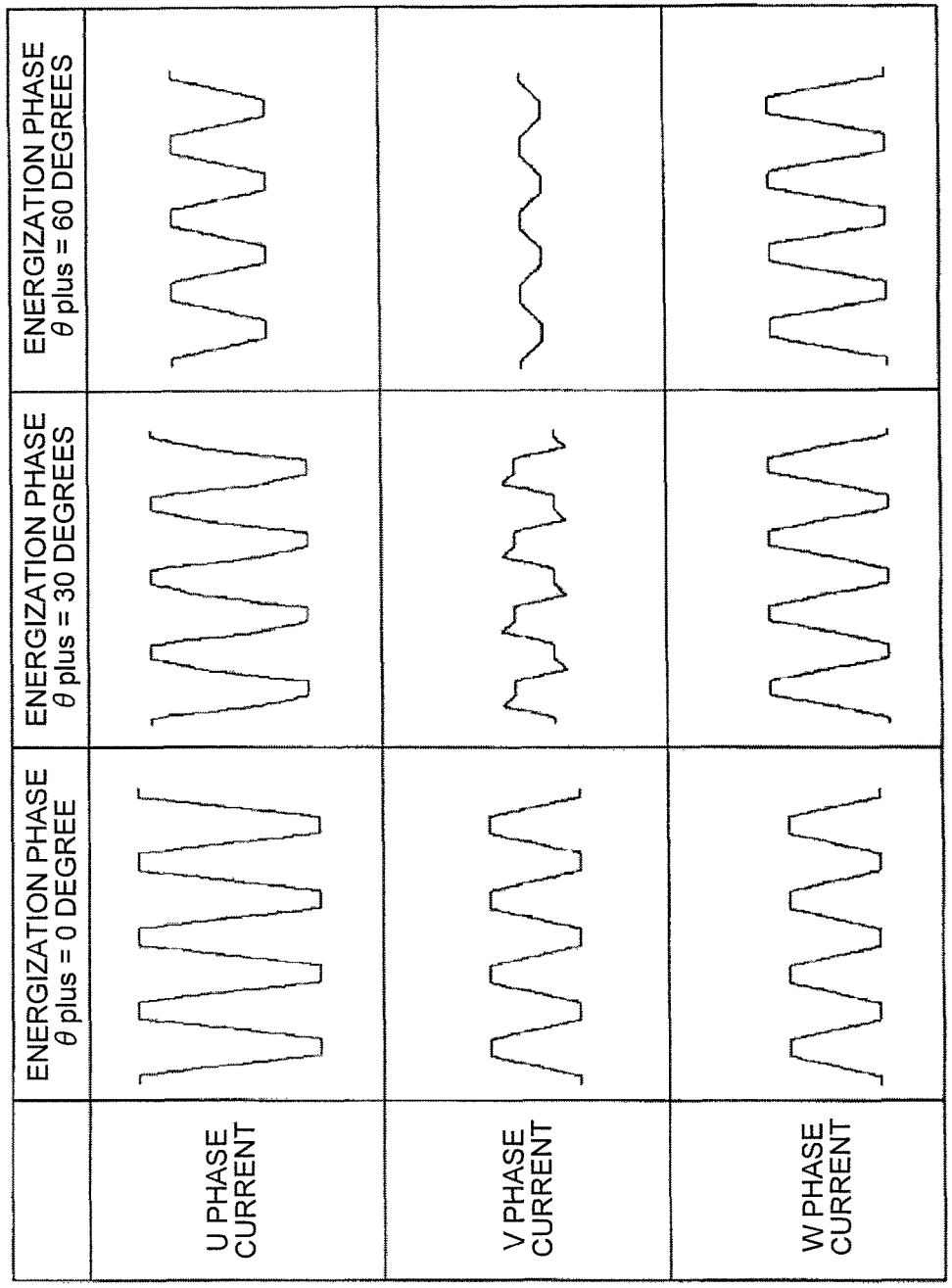
FIG. 14 depicts a current flowing to respective UVW phases of a motor, when the θplus is 0 degree, 30 degrees, and 60 degrees.

FIG. 14 depicts a current flowing to respective UVW phases of the motor, when the θplus is 0 degree (0 degree in the U phase (V4) direction), 30 degrees, and 60 degrees.

When the θplus is 0 degree, as shown in FIG. 5, there is only one other voltage vector (a voltage vector in which one on a positive voltage side and two on a negative voltage side of the switching elements 18a to 18f, or two on the positive voltage side and one on the negative voltage side thereof are turned on) between V0 and V7. In this case, a current waveform becomes a trapezoidal shape, and the current includes less harmonic components.

However, when the θplus is 30 degrees, as shown in FIG. 13, different two voltage vectors are generated between V0 and V7. In this case, the current waveform is distorted, and thus the current includes lots of harmonic components. The distortion of the current waveform may provide adverse effects such as motor noise and motor shaft vibrations.

Furthermore, when the θplus is 60 degrees, there is only one other voltage vector between V0 and V7, as in the case of the θplus being 0 degree. In this case, the current waveform becomes a trapezoidal shape, and the current includes less harmonic components.

As described above, if a voltage on a diagonal line of a hexagonal shape shown in FIG. 12 is output, only one other voltage vector is output between the voltage vector V0 as zero vector and V7, thereby enabling to decrease the distortion of the current waveform. Accordingly, if the θplus has a value n times (n is an integer equal to or larger than 0) the size of 60 degrees, motor noise and motor shaft vibrations can be suppressed by decreasing the distortion of the current waveform.

Therefore, for example, the θplus can be changed by 60 degrees or 120 degrees, which is a phase of n times the size of 60 degrees. However, because it is required to prevent that the heating amount changes depending on the stop position of the rotor, there is no point in changing the θplus by 180 degrees. That is, for example, the θplus needs to be changed by 60 degrees or 120 degrees, which can equalize the current.

When an arithmetic processing unit represented by a microcomputer is used, 60 degrees cannot be accurately realized in view of quantization, and a slight gap may be caused. In this case, the microcomputer can restrict the voltage vector so that a voltage vector having a smaller output (an output time is short), among the two voltage vectors, is not output.

Figure 15:
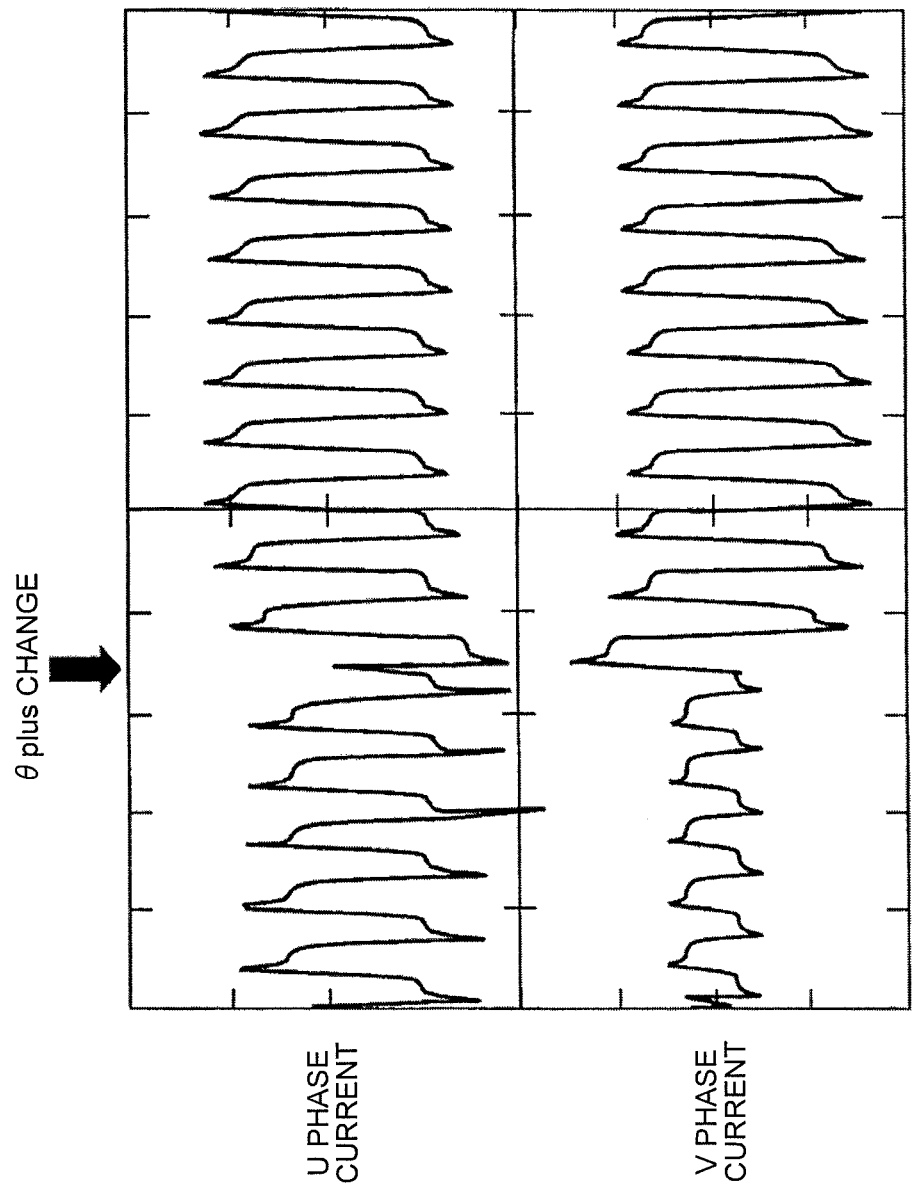
FIG. 15 depicts a current waveform when an energization phase is switched.

As shown in FIG. 15, if the θplus is changed, the energization phase rapidly changes. Therefore, the current flowing to the motor 8 suddenly changes, thereby causing pulsation or the like. Accordingly, when the θplus is changed, motor noise or motor shaft vibrations may occur.

Figure 16:
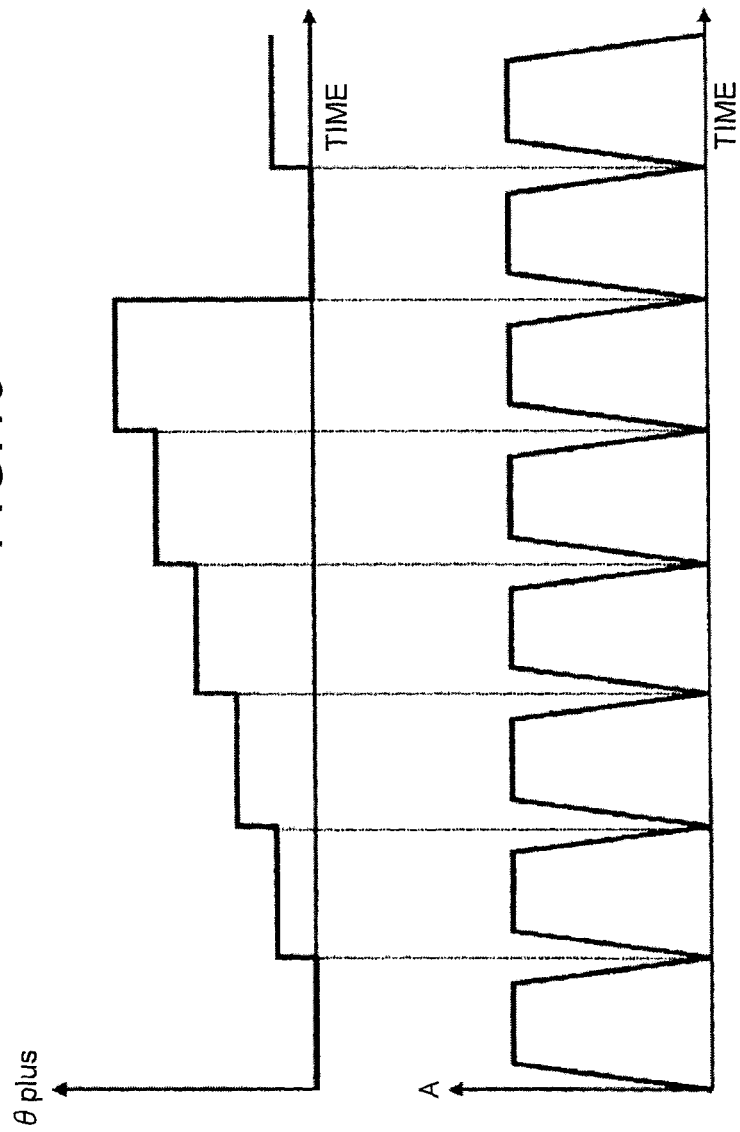
FIG. 16 depicts a relation between the θplus and an amplitude A output by an amplitude output unit 16.
Figure 17:
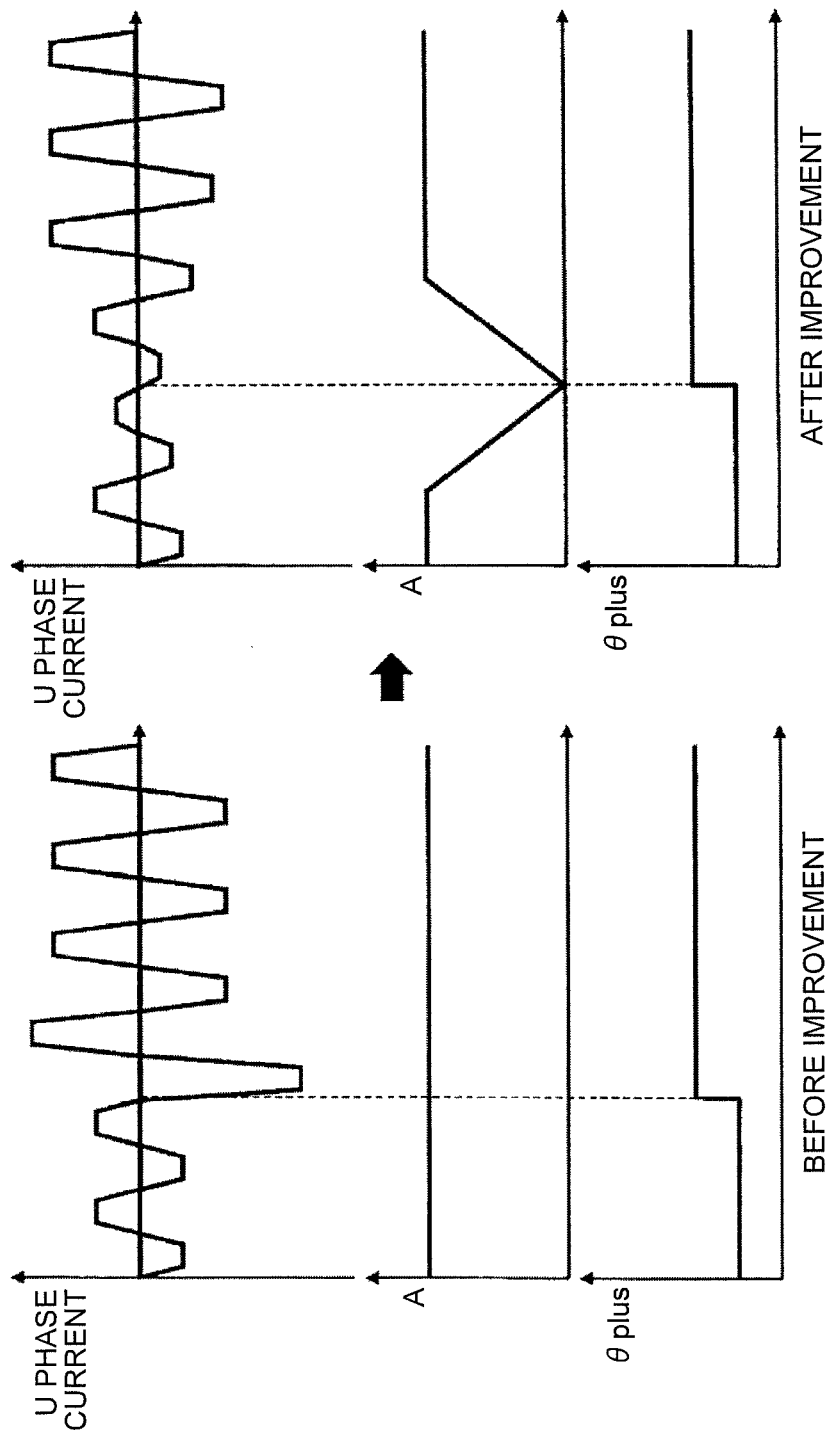
FIG. 17 depicts a state where the current waveform is improved by changing the amplitude A according to switching of the θplus.

Therefore, as shown in FIG. 16, the amplitude output unit 16 gradually decreases the amplitude A immediately before the change of the θplus, and gradually increases the amplitude A immediately after the change of the θplus. For example, the amplitude output unit 16 gradually decreases the amplitude A immediately before the change of the θplus so that the amplitude becomes 0 at the timing of the change of the θplus, and returns the amplitude A to the original size immediately after the change of the θplus. Accordingly, as shown in FIG. 17, the current value decreases at the timing when the θplus is changed, and thus an abrupt change in the current flowing to the motor can be suppressed.

The amplitude output unit 16 can decrease the amplitude A at a time immediately before the change of the θplus, and gradually increase the amplitude A immediately after the change of the θplus.

Figure 18:
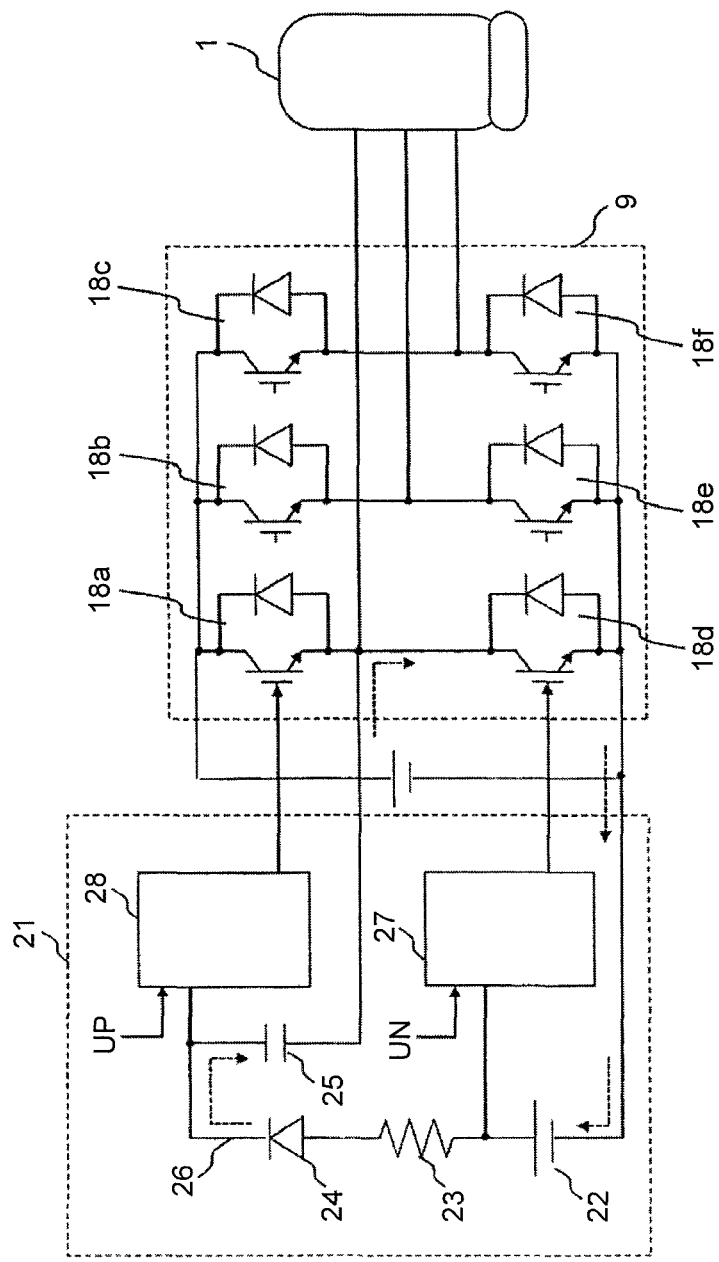
FIG. 18 depicts a drive circuit 21 that drives respective switching elements 18 of an inverter 9, upon reception of PWM signals from the PWM-signal generation unit 17.

FIG. 18 depicts a drive circuit 21 that drives the respective switching elements 18 of the inverter 9, upon reception of the PWM signals from the PWM-signal generation unit 17. Only the drive circuit 21 of the U phase that drives the switching elements 18a and 18d is shown for simplifying explanations. However, in practice, the drive circuits having the same configuration as the drive circuit 21 shown in FIG. 18 are also provided for the V phase and the W phase, respectively.

The drive circuit 21 includes a charge pump circuit 26, a negative-voltage-side switching-element drive circuit 27, and a positive-voltage-side switching-element drive circuit 28.

The charge pump circuit 26 is constituted by sequentially connecting a switching power source 22, a resistance 23, a diode 24, and a capacitor 25. An end of the charge pump circuit 26 on a side of the switching power source 22 is connected to a negative voltage side of the inverter 9, and an end of the charge pump circuit 26 on a side of the capacitor 25 is connected between the switching element 18a on the positive voltage side and the switching element 18d on the negative voltage side of the U-phase series-connected circuit of the inverter 9.

The negative-voltage-side switching-element drive circuit 27 is connected between the switching power source 22 and the resistance 23 of the charge pump circuit 26. Upon reception of the PWM signal UN from the PWM-signal generation unit 17, the negative-voltage-side switching-element drive circuit 27 drives the switching element 18d on the negative voltage side of the inverter 9, when the voltage of the UN indicates turning on.

The positive-voltage-side switching-element drive circuit 28 is connected between the diode 24 and the capacitor 25 of the charge pump circuit 26. Upon reception of the PWM signal UP from the PWM-signal generation unit 17, the positive-voltage-side switching-element drive circuit 28 drives the switching element 18a on the positive voltage side of the inverter 9, when the voltage of the UP indicates turning on.

The negative-voltage-side switching-element drive circuit 27 and the positive-voltage-side switching-element drive circuit 28 need to be driven by a separate power source. In this case, the negative-voltage-side switching-element drive circuit 27 is driven by the switching power source 22, and the positive-voltage-side switching-element drive circuit 28 is driven by a voltage charged in the capacitor 25.

As described above, if the amplitude output unit 16 sets the amplitude to be 0 at the time of the change of the θplus and to be in a non-energized state, the voltage charged in the capacitor 25 decreases. Therefore, the switching element 18a may not be driven normally by the positive-voltage-side switching-element drive circuit 28.

Figure 19:
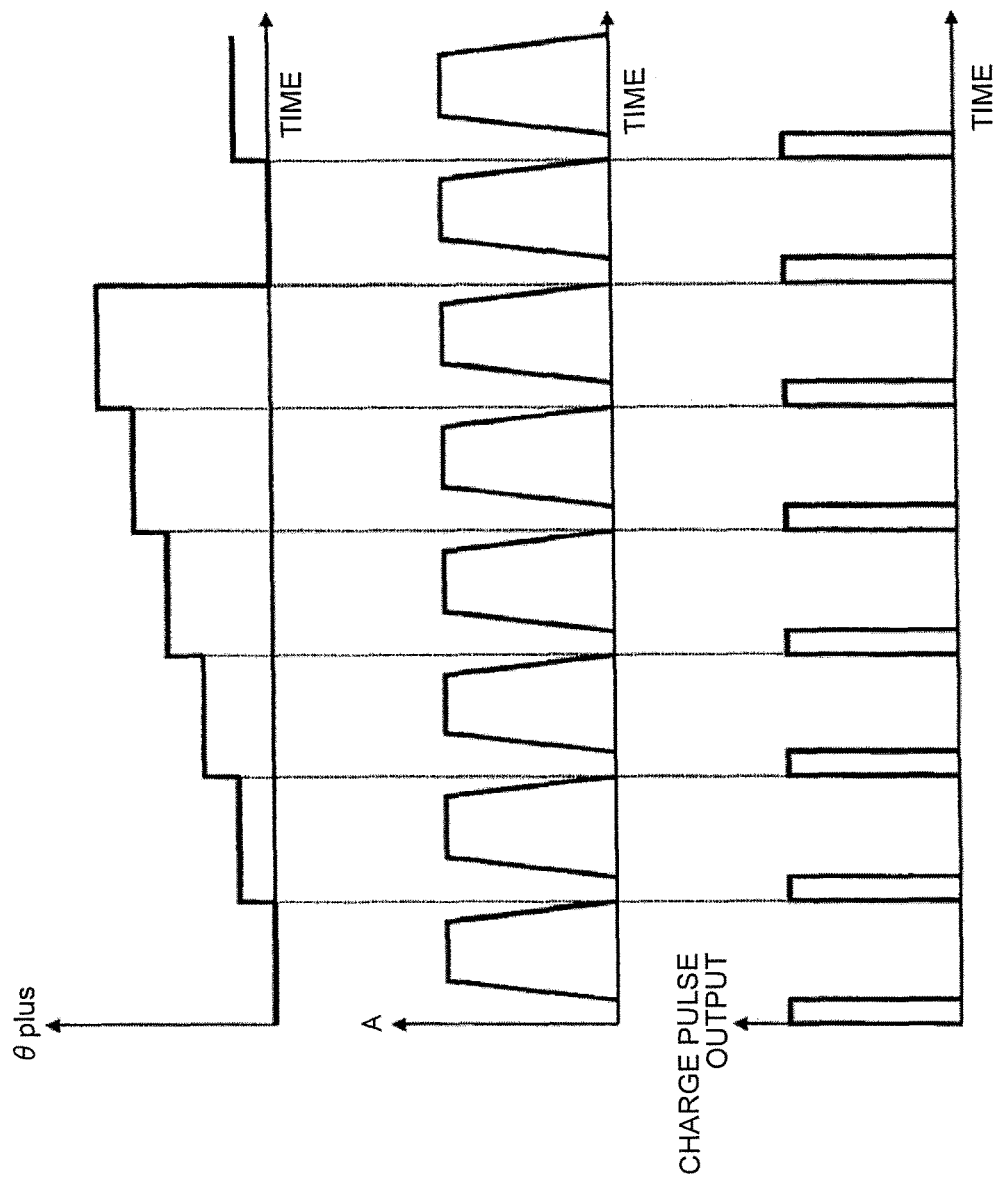
FIG. 19 depicts a relation between the θplus and generation of a charge pulse.

Therefore, as shown in FIG. 19, the negative-voltage-side switching-element drive circuit 27 is driven every time the θplus changes, thereby generating a charge pulse. The voltage is then charged in the capacitor 25 via a route shown by an arrow in FIG. 18, to ensure a power source for driving the positive-voltage-side switching-element drive circuit 28. Accordingly, the positive-voltage-side switching-element drive circuit 28 can be driven normally, thereby decreasing malfunctions and defects.

As described above, in the heat pump device 100 according to the third embodiment, the phase change component θplus that changes with the lapse of time is added to the phase output by the phase switching unit 19, and the result is designated as the phase of the voltage command value. Accordingly, the energization phase of the high-frequency AC voltage changes with the lapse of time, thereby enabling to heat the compressor 1 uniformly without depending on the rotor position.

Particularly, in the heat pump device 100 according to the third embodiment, the phase change component θplus is set to be n times the size of 60 degrees. Accordingly, a distortion of the current waveform can be decreased, and motor noise and motor shaft vibrations can be suppressed.

Fourth Embodiment

In a fourth embodiment, an example of a circuit configuration of the heat pump device 100 is explained.

For example, in FIG. 1 and the like, the heat pump device 100 in which the compressor 1, the four-way valve 2, the heat exchanger 3, the expansion mechanism 4, and the heat exchanger 5 are sequentially connected by a pipe is shown. In the fourth embodiment, the heat pump device 100 having a more specific configuration is explained.

Figure 20:
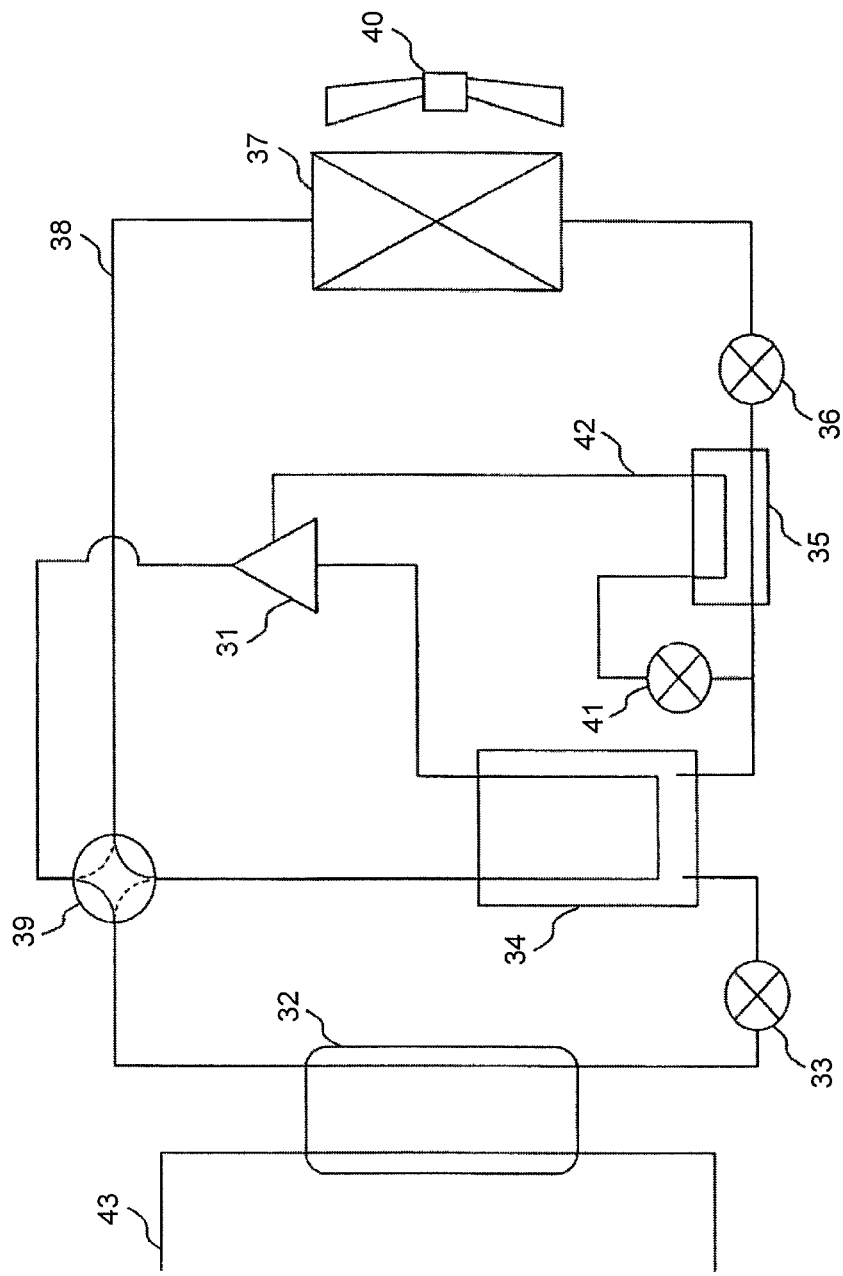
FIG. 20 is a circuit configuration diagram of the heat pump device 100 according to a fourth embodiment.

FIG. 20 is a circuit configuration diagram of the heat pump device 100 according to the fourth embodiment.

Figure 21:
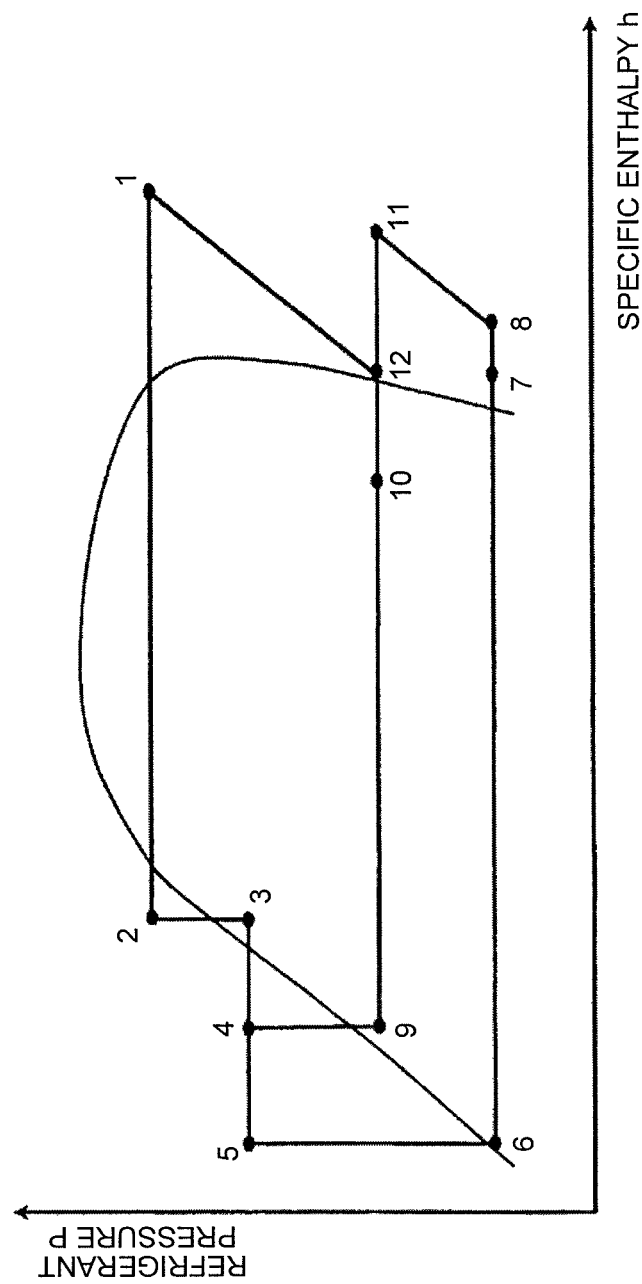
FIG. 21 is a Mollier chart of a refrigerant state in the heat pump device 100 shown in FIG. 20.

FIG. 21 is a Mollier chart of a refrigerant state in the heat pump device 100 shown in FIG. 20. In FIG. 21, a specific enthalpy is plotted on a horizontal axis, and a refrigerant pressure is plotted on a vertical axis.

The heat pump device 100 includes a main refrigerant circuit 38 in which a compressor 31, a heat exchanger 32, an expansion mechanism 33, a receiver 34, an internal heat exchanger 35, an expansion mechanism 36, and a heat exchanger 37 are sequentially connected to each other by the pipe, to circulate a refrigerant. In the main refrigerant circuit 38, a four-way valve 39 is provided on a discharge side of the compressor 31, so that a circulation direction of the refrigerant can be switched. A fan 40 is provided near the heat exchanger 37. The compressor 31 is the compressor 1 explained in the above embodiments, which includes the motor 8 driven by the inverter 9 and the compression mechanism 7.

The heat pump device 100 further includes an injection circuit 42 that connects from between the receiver 34 and the internal heat exchanger 35 to an injection pipe of the compressor 31 by the pipe. An expansion mechanism 41 and the internal heat exchanger 35 are sequentially connected to the injection circuit 42.

A water circuit 43 in which water is circulated is connected to the heat exchanger 32.

An operation of the heat pump device 100 at the time of a heating operation is explained first. At the time of the heating operation, the four-way valve 39 is set to a solid line direction. The heating operation includes not only heating used in air conditioning but also hot water supply for making hot water by heating water.

A gas refrigerant (a point 1 in FIG. 21) that becomes a high-temperature and high-pressure refrigerant in the compressor 31 is discharged from the compressor 31, is heat-exchanged by the heat exchanger 32 serving as a condenser and a radiator, and is liquefied (a point 2 in FIG. 21). At this time, water being circulated in the water circuit 43 is warmed by the heat released from the refrigerant, and can be used for heating and hot water supply.

The liquid refrigerant liquefied by the heat exchanger 32 is depressurized by the expansion mechanism 33, to become a gas-liquid two-phase state (a point 3 in FIG. 21). The refrigerant that becomes the gas-liquid two-phase state is heat-exchanged with the refrigerant sucked into the compressor 31 by the receiver 34, cooled, and liquefied (a point 4 in FIG. 21). The liquid refrigerant liquefied in the receiver 34 is branched and flows to the main refrigerant circuit 38 and the injection circuit 42.

The liquid refrigerant flowing in the main refrigerant circuit 38 is heat-exchanged in the internal heat exchanger 35 with the refrigerant which is depressurized by the expansion mechanism 41 to become the gas-liquid two-phase state and flows in the injection circuit 42, and is further cooled (a point 5 in FIG. 21). The liquid refrigerant cooled by the internal heat exchanger 35 is depressurized by the expansion mechanism 36 to become the gas-liquid two-phase state (a point 6 in FIG. 21). The refrigerant that becomes the gas-liquid two-phase state in the expansion mechanism 36 is heat-exchanged with ambient air in the heat exchanger 37 serving as an evaporator and is heated (a point 7 in FIG. 21). The refrigerant heated in the heat exchanger 37 is further heated in the receiver 34 (a point 8 in FIG. 21), and is sucked into the compressor 31.

Meanwhile, the refrigerant flowing in the injection circuit 42 is depressurized in the expansion mechanism 41 as described above (a point 9 in FIG. 21), and is heat-exchanged in the internal heat exchanger 35 (a point 10 in FIG. 21). The refrigerant in the gas-liquid two-phase state (an injection refrigerant), which is heat-exchanged in the internal heat exchanger 35, flows into the compressor 31 from the injection pipe of the compressor 31 in the gas-liquid two-phase state.

In the compressor 31, the refrigerant sucked in from the main refrigerant circuit 38 (the point 8 in FIG. 21) is compressed to an intermediate pressure and heated (a point 11 in FIG. 21). The injection refrigerant (the point 10 in FIG. 21) joins the refrigerant compressed to the intermediate pressure and heated (the point 11 in FIG. 21), and the temperature decreases (a point 12 in FIG. 21). The refrigerant with the temperature decreased (the point 12 in FIG. 21) is further compressed and heated to become a high-temperature and high-pressure refrigerant, and is discharged (the point 1 in FIG. 21).

When an injection operation is not performed, an aperture of the expansion mechanism 41 is fully closed. That is, when the injection operation is performed, the aperture of the expansion mechanism 41 becomes larger than a predetermined aperture. However, when the injection operation is not performed, the aperture of the expansion mechanism 41 is decreased than the predetermined aperture. Accordingly, the refrigerant does not flow into the injection pipe of the compressor 31.

The aperture of the expansion mechanism 41 is electronically controlled by a control unit such as a microcomputer.

An operation of the heat pump device 100 at the time of a cooling operation is explained next. At the time of the cooling operation, the four-way valve 39 is set to a broken line direction. The cooling operation includes not only cooling used in air conditioning but also making cold water by removing heat from water, freezing, and the like.

The gas refrigerant that becomes the high-temperature and high-pressure refrigerant in the compressor 31 (the point 1 in FIG. 21) is discharged from the compressor 31, heat-exchanged in the heat exchanger 37 serving as the condenser and the radiator, and is liquefied (the point 2 in FIG. 21). The liquid refrigerant liquefied in the heat exchanger 37 is depressurized in the expansion mechanism 36, to become the gas-liquid two-phase state (the point 3 in FIG. 21). The refrigerant that becomes the gas-liquid two-phase state in the expansion mechanism 36 is heat-exchanged, cooled, and liquefied in the internal heat exchanger 35 (the point 4 in FIG. 21). In the internal heat exchanger 35, the refrigerant that becomes the gas-liquid two-phase state in the expansion mechanism 36 is heat-exchanged with the refrigerant, which is in the gas-liquid two-phase state and is obtained by depressurizing the liquid refrigerant liquefied in the internal heat exchanger 35 by the expansion mechanism 41 (the point 9 in FIG. 21). The liquid refrigerant heat-exchanged in the internal heat exchanger 35 (the point 4 in FIG. 21) is branched and flows to the main refrigerant circuit 38 and the injection circuit 42.

The liquid refrigerant flowing in the main refrigerant circuit 38 is heat-exchanged with the refrigerant sucked into the compressor 31 in the receiver 34 and further cooled (the point 5 in FIG. 21). The liquid refrigerant cooled in the receiver 34 is depressurized in the expansion mechanism 33 to become the gas-liquid two-phase state (the point 6 in FIG. 21). The refrigerant that becomes the gas-liquid two-phase state in the expansion mechanism 33 is heat-exchanged in the heat exchanger 32 serving as the evaporator and heated (the point 7 in FIG. 21). At this time, because the refrigerant absorbs heat, water being circulated in the water circuit 43 is cooled and used for cooling and freezing.

The refrigerant heated in the heat exchanger 32 is further heated in the receiver 34 (the point 8 in FIG. 21), and sucked into the compressor 31.

Meanwhile, the refrigerant flowing in the injection circuit 42 is depressurized in the expansion mechanism 41 as described above (the point 9 in FIG. 21), and is heat-exchanged in the internal heat exchanger 35 (the point 10 in FIG. 21). The refrigerant in the gas-liquid two-phase state (the injection refrigerant), which is heat-exchanged in the internal heat exchanger 35, flows from the injection pipe of the compressor 31 in the gas-liquid two-phase state.

A compression operation in the compressor 31 is the same as the heating operation.

When the injection operation is not performed, the aperture of the expansion mechanism 41 is fully closed as in the heating operation, so that the refrigerant does not flow into the injection pipe of the compressor 31.

In the above explanations, it is explained that the heat exchanger 32 is a heat exchanger such as a plate heat exchanger that performs heat exchange between the refrigerant and water being circulated in the water circuit 43. However, the heat exchanger 32 is not limited thereto, and can perform heat exchange between the refrigerant and the air.

Furthermore, the water circuit 43 can be a circuit in which not the water but another fluid is circulated.

As described above, the heat pump device 100 can be used for a heat pump device using an inverter compressor such as an air conditioning unit, a heat pump hot-water supply device, a refrigerator, and a freezer.

The invention claimed is:

1. A heat pump device comprising:
   a compressor having a compression mechanism that compresses a refrigerant;
   a motor that includes a rotor and operates the compression mechanism provided in the compressor;
   an inverter that applies a voltage to the motor; and
   an inverter control unit that controls the inverter, wherein the inverter control unit includes
   a phase switching unit that alternately switches between two fixed phases and respectively outputs one of the fixed phases as a fixed phase,
   an addition unit that changes a value n, which is an integer equal to or larger than 0, for every predetermined time, and outputs a phase θ3 obtained by adding a phase θplus, which is a value of n times 60 degrees that does not depend on a position of the rotor, to the fixed phase output from the phase switching unit,
   a voltage generation unit that, when the compressor is stopped and when the rotor is correspondingly stopped, generates a voltage command value based on the phase θ3 output by the addition unit and outputs the voltage command value, and
   a drive-signal generation unit that, based on an output from the voltage generation unit, generates drive signals corresponding to respective switching elements of the inverter, outputs respective generated drive signals to the corresponding switching elements of the inverter, and generates a high-frequency AC voltage in the inverter.

2. The heat pump device according to claim 1, wherein the phase switching unit alternately switches a phase θ1 and a phase θ2 different from the phase θ1 by 180 degrees and outputs the fixed phase, synchronously with a reference signal having a predetermined frequency.

3. The heat pump device according to claim 1, wherein the inverter is a three-phase inverter,
   the drive-signal generation unit outputs a drive signal that turns on one of two switching elements in each series-connected circuit of the three-phase inverter and turns off the other, and
   outputs a drive signal having a switching pattern in which one or two switching elements, among switching elements on a positive voltage side of the three-phase inverter, are turned on, in such a manner that only one pattern is output in a half-cycle period of the reference signal.

4. The heat pump device according to claim 1, further comprising:
   an amplitude output unit that outputs an amplitude A having a predetermined width, in such a manner that when the addition unit changes the value n, the amplitude A is decreased, and after the addition unit has changed the value n, the amplitude A is gradually increased to return to the original predetermined width, wherein
   the voltage generation unit generates the voltage command value based on the phase θ3 output from the addition unit and the amplitude A output from the amplitude output unit.

5. The heat pump device according to claim 1, further comprising:
   a drive circuit that drives the switching elements in the series-connected circuit of the inverter, wherein
   the drive circuit includes
   a negative-voltage-side drive circuit driven by a voltage of a switching power source to drive the switching element on a negative voltage side of the inverter, and
   a positive-voltage-side drive circuit driven by a voltage of a capacitor charged by driving the negative-voltage-side drive circuit to drive the switching element on a positive voltage side of the inverter, and
   the inverter control unit drives the negative-voltage-side drive circuit when the addition unit changes the value n and charges the capacitor with the voltage.

6. The heat pump device according to claim 1, wherein the voltage generation unit outputs an AC voltage command value having a frequency higher than an operating frequency at a time of a compression operation of the motor.

7. The heat pump device according to claim 1, wherein the phase switching unit switches the fixed phase at timings of at least any of tops and bottoms of the reference signal.

8. The heat pump device according to claim 1, wherein a rotor of the motor has an IPM (Interior Permanent Magnet) structure.

9. The heat pump device according to claim 1, wherein the inverter control unit further includes a detection unit that detects a state where an outside air temperature has risen by more than a predetermined temperature, as compared to a temperature before a predetermined time, and
   when the detection unit has detected the state, the voltage generation unit outputs the voltage command value.

10. The heat pump device according to claim 1, further comprising
    a detection unit that detects that a state where a temperature of the compressor is lower than the outside air temperature continues for a predetermined time, wherein
    when the detection unit has detected the state, the voltage generation unit outputs the voltage command value.

11. The heat pump device according to claim 1, wherein the voltage generation unit outputs the voltage command value, every time the predetermined time has passed since shutting down the compressor.

12. The heat pump device according to claim 1, wherein the switching elements constituting the inverter are wide gap semiconductors.

13. The heat pump device according to claim 12, wherein the wide gap semiconductors are made of any one of SiC, GaN, or diamond.

14. The heat pump device according to claim 1, wherein the switching elements constituting the inverter are MOSFETs having a super junction structure.

15. A heat pump system comprising: a heat pump device including a refrigerant circuit in which a compressor, a first heat exchanger, an expansion mechanism, and a second heat exchanger are sequentially connected by a pipe; and a fluid using device that uses a fluid heat-exchanged with a refrigerant in the first heat exchanger connected to the refrigerant circuit, wherein
    the heat pump device includes
    the compressor having a compression mechanism that compresses the refrigerant,
    a motor that includes a rotor and operates the compression mechanism provided in the compressor,
    an inverter that applies a voltage to the motor, and
    an inverter control unit that controls the inverter, wherein the inverter control unit includes a phase switching unit that alternately switches a phase θ1 and a phase θ2 different from the phase θ1 by 180 degrees and outputs the phase, synchronously with a reference signal having a predetermined frequency, an addition unit that changes a value n, which is an integer equal to or larger than 0, for every predetermined time, and outputs a phase θ3 obtained by adding a phase θplus, which is a value of n times 60 degrees that does not depend on a position of the rotor, to the phase output from the phase switching unit, a voltage generation unit that, when the compressor is stopped and when the rotor is correspondingly stopped, generates a voltage command value based on the phase θ3 output by the addition unit and outputs the voltage command value, and a drive-signal generation unit that compares the voltage command value output from the voltage generation unit with the reference signal to generate drive signals corresponding to respective switching elements of the inverter, outputs respective generated drive signals to the corresponding switching elements of the inverter, and generates a high-frequency AC voltage in the inverter.

16. A control method for an inverter in a heat pump device that includes a compressor having a compression mechanism for compressing a refrigerant, a motor that includes a rotor and operates the compression mechanism provided in the compressor, and an inverter that applies a voltage to the motor, wherein the inverter control method comprises:

a phase switching step at which a phase θ1 and a phase θ2 different from the phase θ1 by 180 degrees are alternately switched and output, synchronously with a reference signal having a predetermined frequency;

an adding step at which a value n, which is an integer equal to or larger than 0, is changed for every predetermined time, to output a phase θ3 obtained by adding a phase θplus, which is a value of n times 60 degrees that does not depend on a position of the rotor, to the phase output from the phase switching step;

a voltage generating step that, when the compressor is stopped and when the rotor is correspondingly stopped, a voltage command value is generated based on the phase θ3 output at the adding step and output; and a drive-signal generating step at which the voltage command value output from the voltage generation step is compared with the reference signal to generate drive signals corresponding to respective switching elements of the inverter, respective generated drive signals are output to the corresponding switching elements of the inverter, and a high-frequency AC voltage is generated in the inverter.

17. The heat pump device according to claim 1, wherein the n is changed to increment by 1 for the every predetermined time.

18. The heat pump system according to claim 15, wherein the n is changed to increment by 1 for the every predetermined time.

19. The control method according to claim 16, wherein the n is changed to increment by 1 for the every predetermined time.

\* \* \* \* \*